(12) United States Patent
Burchfield et al.

(10) Patent No.: US 8,851,236 B2
(45) Date of Patent: Oct. 7, 2014

(54) SAFETY LOCKOUT SYSTEM

(71) Applicant: Sky Climber, LLC, Delaware, OH (US)

(72) Inventors: Brent Burchfield, Powell, OH (US);
Robert E. Eddy, Johnstown, OH (US)

(73) Assignee: Sky Climber, LLC, Delaware, OH (US)

( * ) Notice: Subject to any disclaimer, the term of this patent is extended or adjusted under 35 U.S.C. 154(b) by 0 days.

(21) Appl. No.: 14/137,257

(22) Filed: Dec. 20, 2013

(65) Prior Publication Data
US 2014/0105671 A1 Apr. 17, 2014

Related U.S. Application Data

(62) Division of application No. 13/222,092, filed on Aug. 31, 2011, now Pat. No. 8,636,112.

(51) Int. Cl.
*B66F 7/00* (2006.01)
*F16B 1/04* (2006.01)
*E04G 1/20* (2006.01)

(52) U.S. Cl.
CPC .... *F16B 1/04* (2013.01); *E04G 1/20* (2013.01)
USPC .......................................... 187/207; 182/148

(58) Field of Classification Search
USPC .......................................... 187/208; 182/148
See application file for complete search history.

(56) References Cited

U.S. PATENT DOCUMENTS

| | | | |
|---|---|---|---|
| 71,791 A | 12/1867 | Robinson | |
| 1,061,103 A | 5/1913 | Moskal | |
| 2,266,915 A | 12/1941 | Steedman | |
| 2,403,333 A | 7/1946 | Bjerke | |
| 2,646,858 A | 7/1953 | Sahlin | |
| 3,071,205 A | 1/1963 | Beck | |
| 3,083,787 A | 4/1963 | Isbell | |
| 3,146,855 A | 9/1964 | Aberegg | |
| 3,323,616 A | 6/1967 | Best | |
| 3,386,722 A | 6/1968 | Brooks et al. | |

(Continued)

FOREIGN PATENT DOCUMENTS

| | | |
|---|---|---|
| CN | 201778481 | 3/2011 |
| WO | WO2010019558 | 2/2010 |

OTHER PUBLICATIONS

International Search Report and Written Opinion of the International Searching Authority for International Application No. PCT/US2012/050856. Mailed on Oct. 22, 2012. 7 pages.

*Primary Examiner* — Alvin Chin-Shue
(74) *Attorney, Agent, or Firm* — David J. Dawsey; Michael J. Gallagher; Gallagher & Dawsey Co., LPA

(57) ABSTRACT

A safety lockout system for releasably locking a mast guided working surface to a mast is provided. The safety lockout system may include an outer rollcase, an inner rollcase, and a lockout assembly. The lockout assembly includes a retractable dog that is movable between an engaged position and a disengaged position. The lockout assembly may include a dog release device that operates both manually and automatically to move the retractable dog from the disengaged position to the engaged position. Automatic operation of the dog release device is triggered when the working surface experiences a tilted condition. A dog emergency release device may be provided to manually move the retractable dog to the disengaged position in the event of a malfunction. The lockout assembly may include a lockout assembly locking device that allows a portion of the lockout assembly to fold up and move the retractable dog to the disengaged position.

11 Claims, 27 Drawing Sheets

(56) References Cited

U.S. PATENT DOCUMENTS

| | | | |
|---|---|---|---|
| 4,294,332 A * | 10/1981 | Ready | 182/141 |
| 4,331,219 A | 5/1982 | Suzuki | |
| 5,275,647 A | 1/1994 | Winnik | |
| 5,487,446 A | 1/1996 | Patnode et al. | |
| 5,651,429 A | 7/1997 | Lin | |
| 5,803,206 A | 9/1998 | Halstead et al. | |
| 5,909,783 A | 6/1999 | Berish | |
| 6,382,358 B1 | 5/2002 | Kritzer | |
| 6,425,462 B1 | 7/2002 | Tran et al. | |
| 7,044,269 B2 | 5/2006 | Azran | |
| 7,090,051 B2 | 8/2006 | Robillard | |
| 7,207,419 B2 | 4/2007 | Fore et al. | |
| 7,334,664 B2 | 2/2008 | Fäßler | |
| 8,292,039 B2 * | 10/2012 | Campbell et al. | 187/261 |
| 2007/0000724 A1 | 1/2007 | Anasis et al. | |
| 2007/0169996 A1 * | 7/2007 | Blue et al. | 182/141 |

* cited by examiner

SAFETY LOCKOUT SYSTEM

CROSS-REFERENCE TO RELATED APPLICATIONS

This application is a divisional application of U.S. application Ser. No. 13/222,092 filed Aug. 31, 2011. The entire content of each application is incorporated by reference herein.

STATEMENT REGARDING FEDERALLY SPONSORED RESEARCH OR DEVELOPMENT

Not applicable.

TECHNICAL FIELD

The present disclosure relates to the field of access systems, and more particularly, to a safety lockout system for releasably locking a mast guided working surface to a mast.

BACKGROUND OF THE INVENTION

Mast climbing work platforms have become a popular means of accessing elevated working sites. Although mast climbing work platforms are considered safer than traditional frame scaffolding, the safety of mast climbing work platforms remains of paramount importance.

Generally, mast climbing work platforms will include safety features such as braking and fall arrest systems, leveling and/or limit switches, and the like. For example, the mast climbing work platform may be controlled with a pendant having an emergency stop button to prevent the platform from raising or lowering. Additionally, the mast climbing work platform may have a speed limiter or centrifugal braking system to prevent the platform from falling due to an overspeed situation. Moreover, the mast climbing work platform may be equipped with a manual lowering system to enable lowering of the work platform if the power supply is interrupted.

In addition to these safety features, a device that is capable of both manually and automatically locking the mast climbing work platform to the mast to further increase the safety of the mast climbing work platform would be ideal. The presently disclosed safety lockout system addresses this need, as well as others.

SUMMARY OF THE INVENTION

In its most general configuration, the safety lockout system advances the state of the art with a variety of new capabilities and overcomes many of the shortcomings of prior devices in new and novel ways. The safety lockout system overcomes the shortcomings and limitations of the prior art in any of a number of generally effective configurations. The safety lockout system demonstrates such capabilities and overcomes many of the shortcomings of prior devices and methods in new and novel ways.

The present disclosure relates to a safety lockout system for releasably locking a mast guided working surface to a mast. The safety lockout system may generally include an outer rollcase, an inner rollcase, and a lockout assembly. The lockout assembly may be connected to the outer and inner rollcases and is generally configured to releasably lock the mast guided working surface to the mast. Additionally, the lockout assembly is designed to automatically lock the mast guided working surface to the mast should a free fall condition occur.

In order to releasably lock the mast guided working surface to the mast, the lockout assembly includes a retractable dog that is movable between an engaged position and a disengaged position. When the mast guided working surface is being raised or lowered the lockout assembly is configured to retain the retractable dog in the disengaged position to prevent the retractable dog from engaging the mast during movement of the mast guided working surface.

The lockout assembly may further include a dog release device. The dog release device operates to move the retractable dog from the disengaged position to the engaged position. The dog release device may be manually operated by a user to move the retractable dog to the engaged position to lock the mast guided working surface at a desired height on the mast. Additionally, the dog release device is designed to automatically actuate if the mast guided working surface experiences a tilted condition.

In one embodiment, the lockout assembly may include a dog emergency release device. The dog emergency release device is designed to move the retractable dog from the engaged position to the disengaged position. In essence, the dog emergency release device acts as a manual override in the event that the lockout assembly malfunctions and the retractable dog is stuck in the engaged position.

In another embodiment, the lockout assembly may include a lockout assembly locking device. Operation of the lockout assembly locking device allows a portion of the lockout assembly to fold up and move the retractable dog to the disengaged position.

Numerous alterations, modifications, and variations of the preferred embodiments disclosed herein will be apparent to those skilled in the art and they are all anticipated and contemplated to be within the spirit and scope of the present disclosure.

BRIEF DESCRIPTION OF THE DRAWINGS

Without limiting the scope of the safety lockout system and lockout assembly as claimed below and referring now to the drawings and figures:

Figure 1:
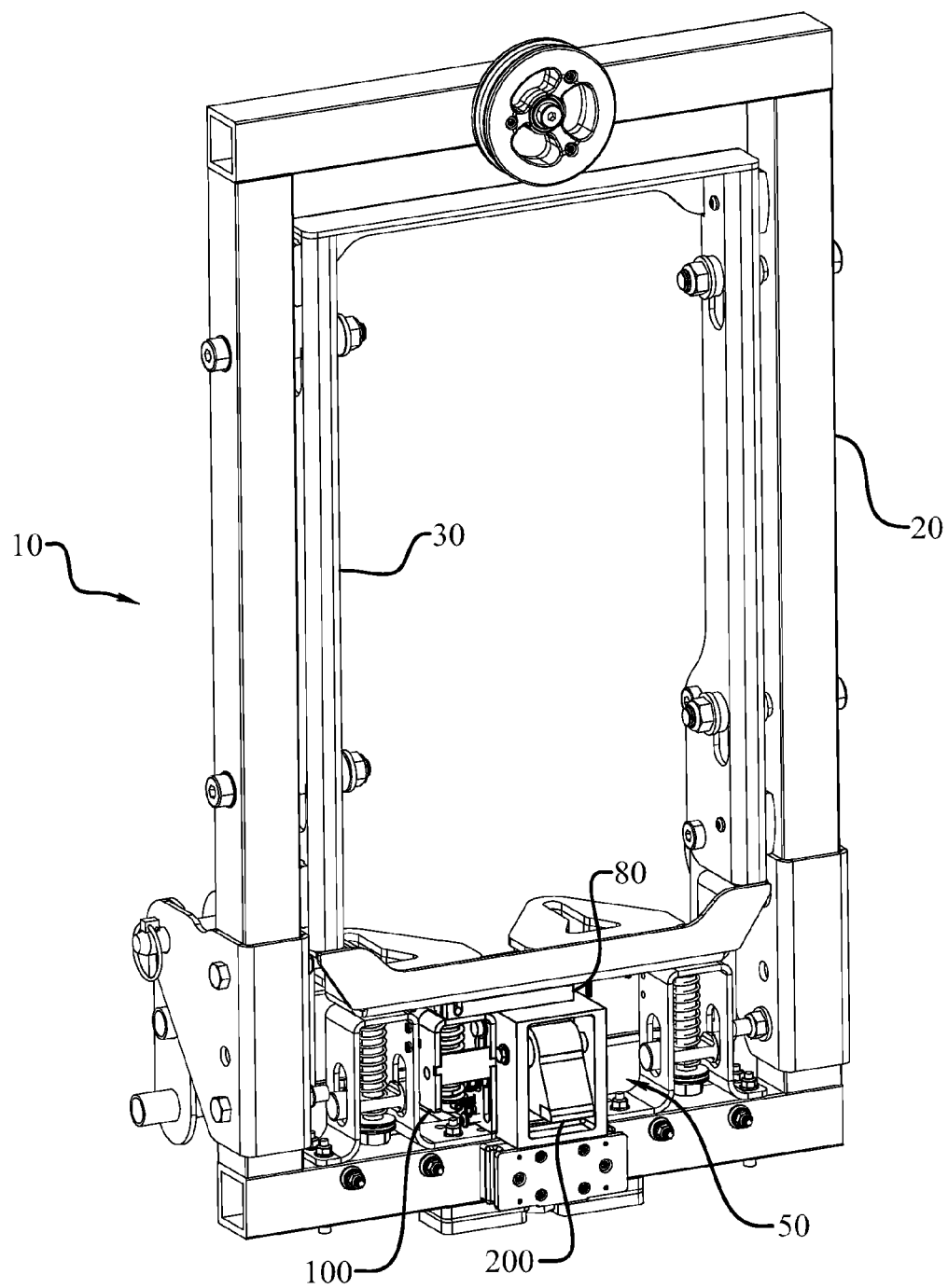
FIG. 1 is a perspective view of an embodiment of a safety lockout system, not to scale.

These drawings are provided to assist in the understanding of the exemplary embodiments of the safety lockout system and lockout assembly as described in more detail below and should not be construed as unduly limiting the device. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The presently disclosed safety lockout system (10) enables a significant advance in the state of the art. The preferred embodiments of the safety lockout system (10) accomplish this by new and novel arrangements of elements and methods that are configured in unique and novel ways and which demonstrate previously unavailable but preferred and desirable capabilities. The description set forth below in connection with the drawings is intended merely as a description of the embodiments of the claimed safety lockout system (10), and is not intended to represent the only form in which the safety lockout system (10) may be constructed or utilized. The description sets forth the designs, functions, means, and methods of implementing the safety lockout system (10) in connection with the illustrated embodiments. It is to be understood, however, that the same or equivalent functions and features may be accomplished by different embodiments that are also intended to be encompassed within the spirit and scope of the claimed safety lockout system (10).

Referring generally to FIGS. 1-26, a safety lockout system (10) for releasably locking a mast guided working surface (not shown) to a mast (not shown) is illustrated. Non-limiting examples of the mast guided working surface and the mast are disclosed in U.S. Patent Application Publication No. 2010/0032237 and U.S. Pat. No. D611,673, the contents of which are hereby incorporated by reference. Generally, the mast includes a plurality of spaced recesses along its length that may be engaged by a portion of the safety lockout system (10) to releasably lock the mast guided working surface at a desired height on the mast.

Figure 2:
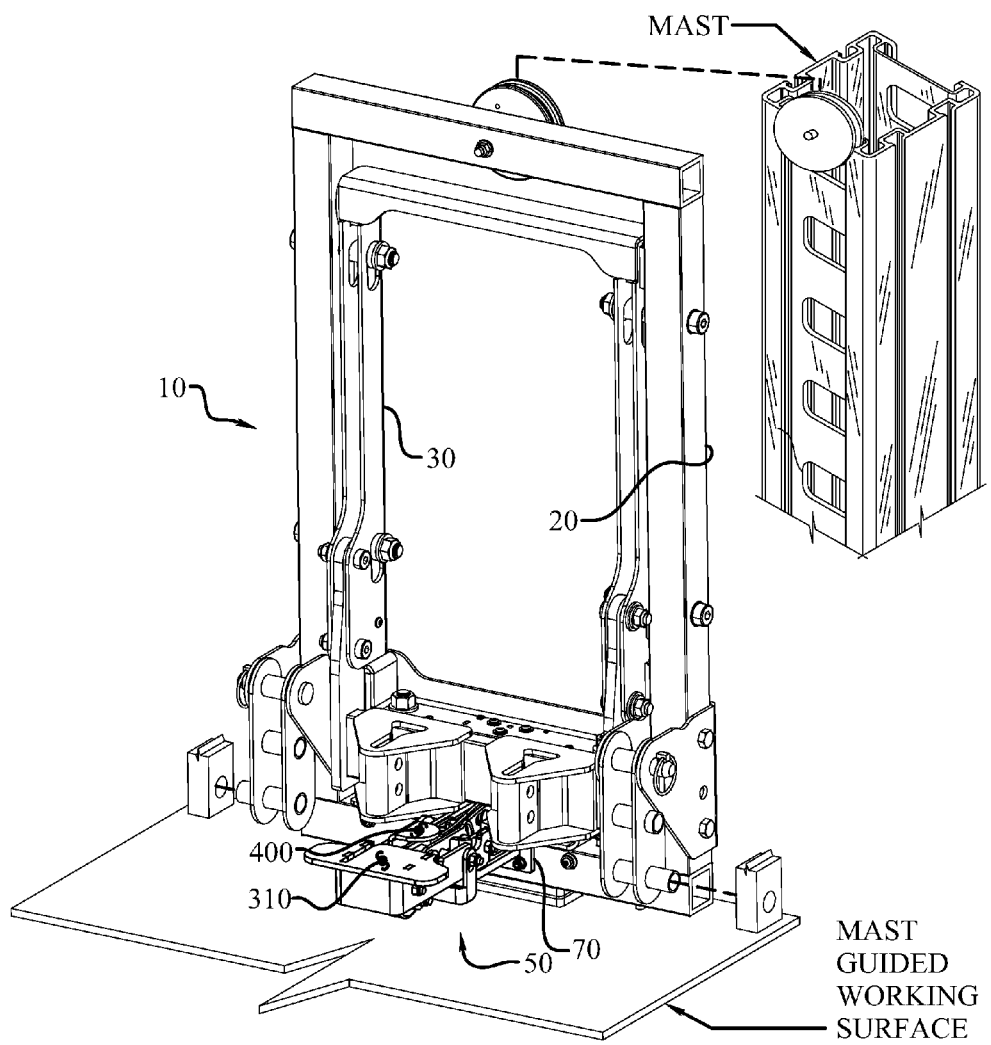
FIG. 2 is a perspective view of an embodiment of a safety lockout system, not to scale.

As seen in FIGS. 1 and 2, the safety lockout system (10) may include an outer rollcase (20), an inner rollcase (30), and a lockout assembly (50). In operation, the outer rollcase (20) is connected to the mast guided working surface (not shown) and is slidably engaged with the mast (not shown). The inner rollcase (30) is connected to the outer rollcase (20) in such a way that the inner rollcase (30) is able to translate upward and downward with respect to the outer rollcase (20). The lockout assembly (50) may include a lower connection plate (70) that allows the lockout assembly (50) to connect to the outer rollcase (20). Additionally, the lockout assembly (50) may include an upper connection plate (80) to connect the lockout assembly (50) to the inner rollcase (30).

In one embodiment, the mast guided working surface may have means (e.g., a guide wheel) to directly engage the mast and allow for translational movement. In such an embodiment, the inner rollcase (30) may be connected to the mast guided working surface in such a way that the inner rollcase (30) may translate with respect to the mast guided working surface. Moreover, in this embodiment, the lockout assembly (50) may be connected to a portion of the mast guided working surface, and also connected to the inner rollcase (30) by the upper connection plate (80).

Although not depicted in the drawings, a hoist or other lifting means may be connected to the inner rollcase (30) and utilized to raise and lower the mast guided working surface along the mast. When the hoist or other lifting means is operated to raise or lower the mast guided working surface, the inner rollcase (30) is caused to translate with respect to the outer rollcase (20).

With reference now to FIGS. 16-21, an embodiment of the lockout assembly (50) is shown. As noted above, the lockout assembly (50) may include a lower connection plate (70) and an upper connection plate (80) to connect the lockout assembly (50) to the outer and inner rollcases (20, 30). The lockout assembly (50) also includes a rear frame member (60) and a housing (90) to which a number of the lockout assembly's (50) components are connected. As will be explained in greater detail below, the lockout assembly (50) is configured to engage the mast to releasably lock the mast guided working surface to the mast, and also includes a number of safety features designed to prevent harm to users as well as the lockout assembly (50) itself.

Figure 16:
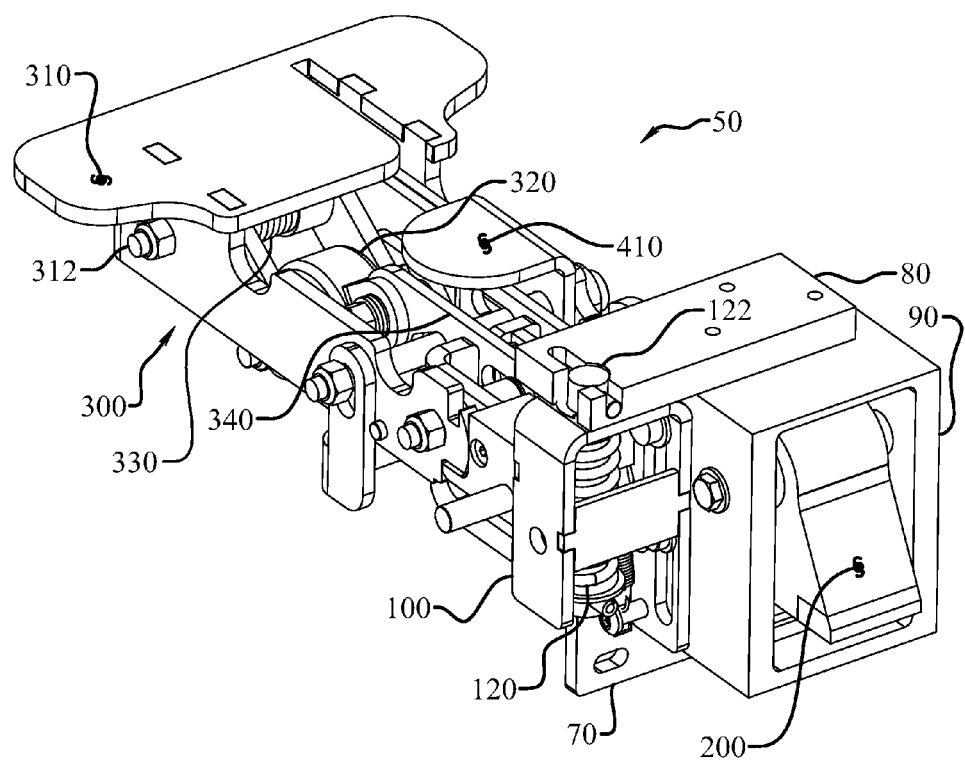
FIG. 16 is a perspective view of an embodiment of a lockout assembly, not to scale.
Figure 20:
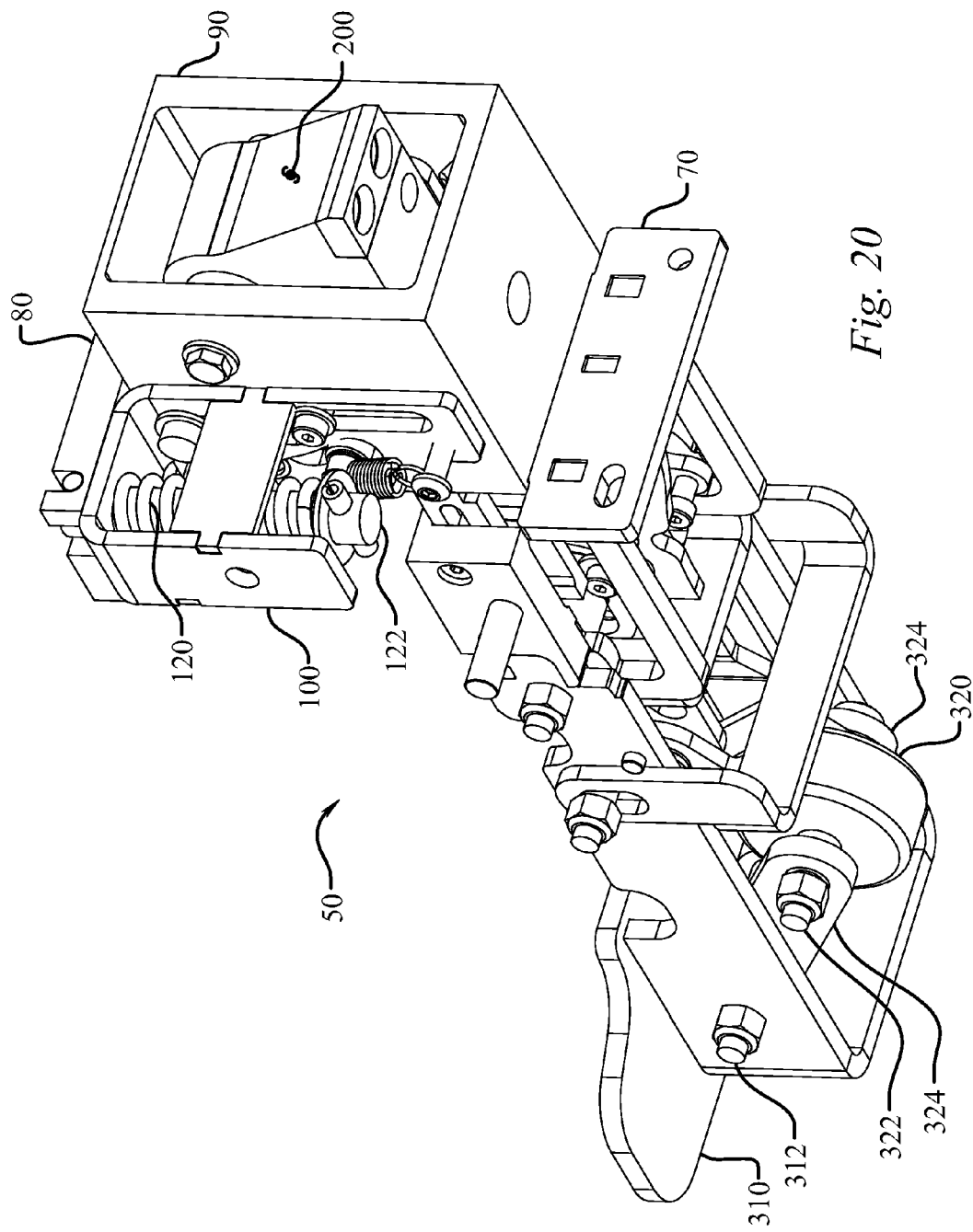
FIG. 20 is a perspective view of an embodiment of a lockout assembly, not to scale.
Figure 21:
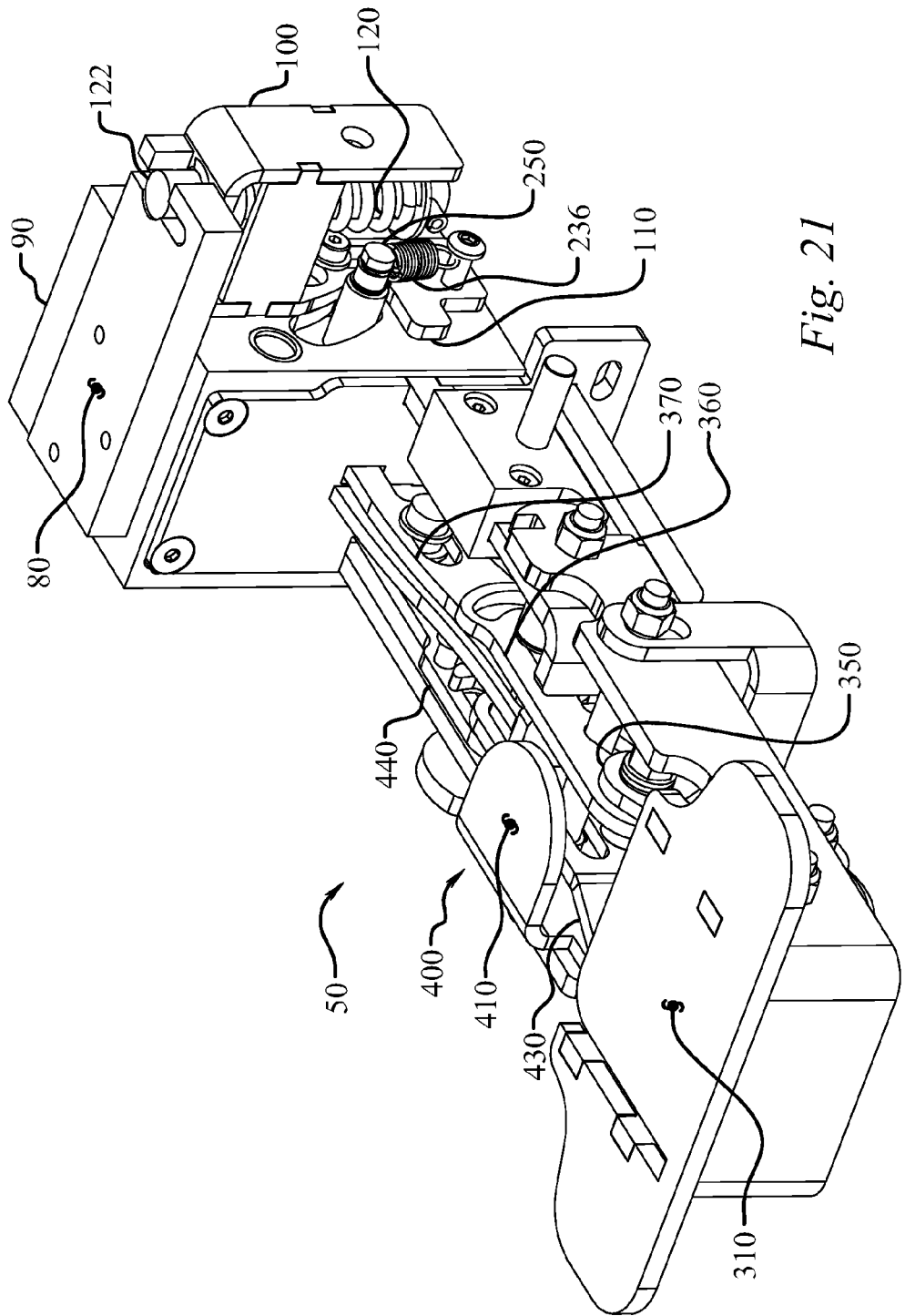
FIG. 21 is a perspective view of an embodiment of a lockout assembly, not to scale.
Figure 25A:
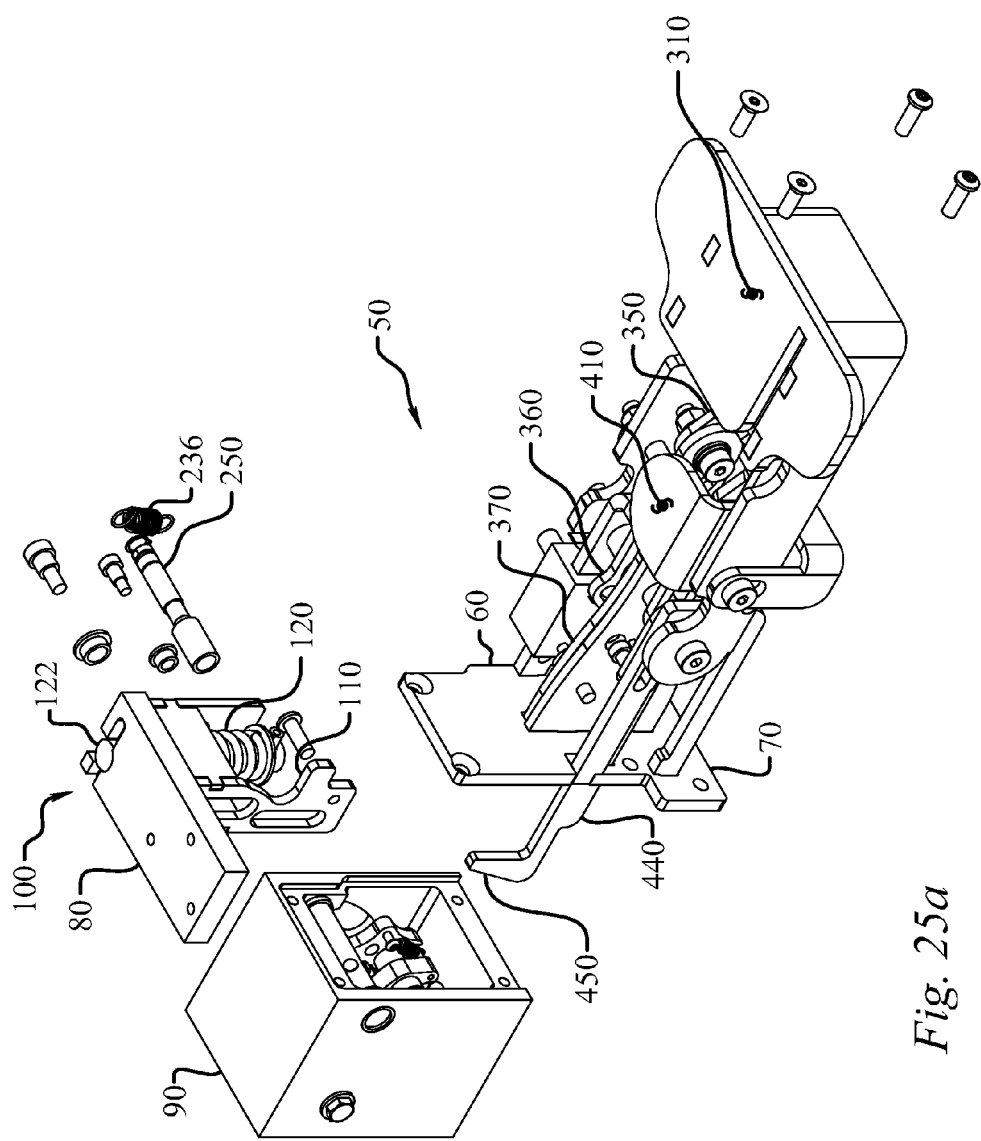
FIG. 25*a* is a partial exploded view of an embodiment of a lockout assembly, not to scale.

Referring now to FIGS. 20, 21, and 25*a*, the lockout assembly (50) includes an overload mechanism (100). The overload mechanism (100) may be slidably connected to the housing (90) via fasteners that pass through slots in the overload mechanism (100), as seen in FIG. 16, such that the overload mechanism (100) is able to translate upward and downward with respect to the housing (90). As seen in FIGS. 21 and 25*a*, the overload mechanism (100) includes a lifting cradle (110) and an overload spring (120) that is mounted about an overload spring post (122). The overload spring post (122) is also utilized to connect the overload mechanism (100) to the upper connection plate (80). As a result, when the inner rollcase (30) translates upward, the upper connection plate (80) is lifted upward along with the inner rollcase (30), which causes the overload mechanism (100) to translate upward. Similarly, when the inner rollcase (30) translates downward, the upper connection plate (80) is lowered along with the inner rollcase (30), which results in the overload mechanism (100) translating downward. As will be explained below, the upward and downward translation of the overload mechanism (100) allows the lockout assembly (50) to disengage and engage the mast.

Figure 3:
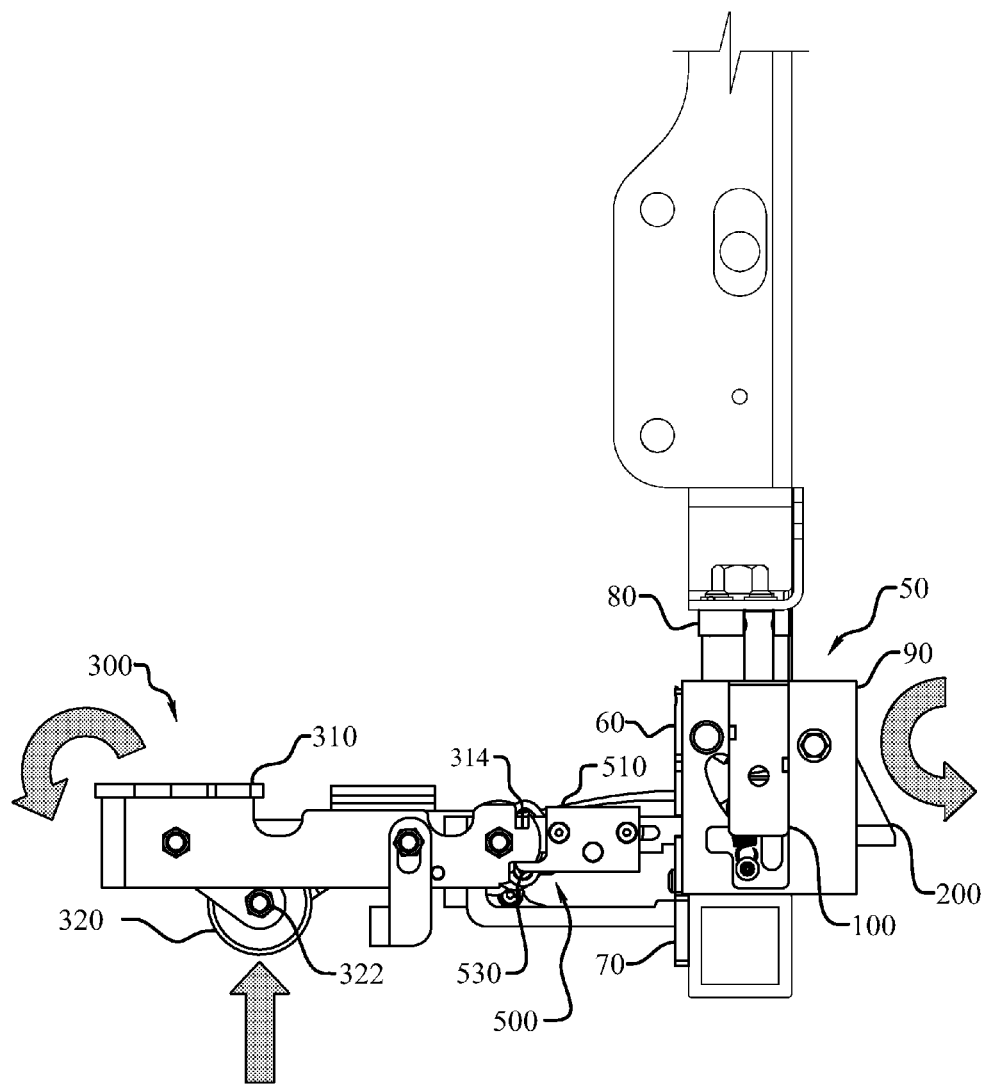
FIG. 3 is a left side elevational view of an embodiment of a lockout assembly, not to scale.
Figure 4:
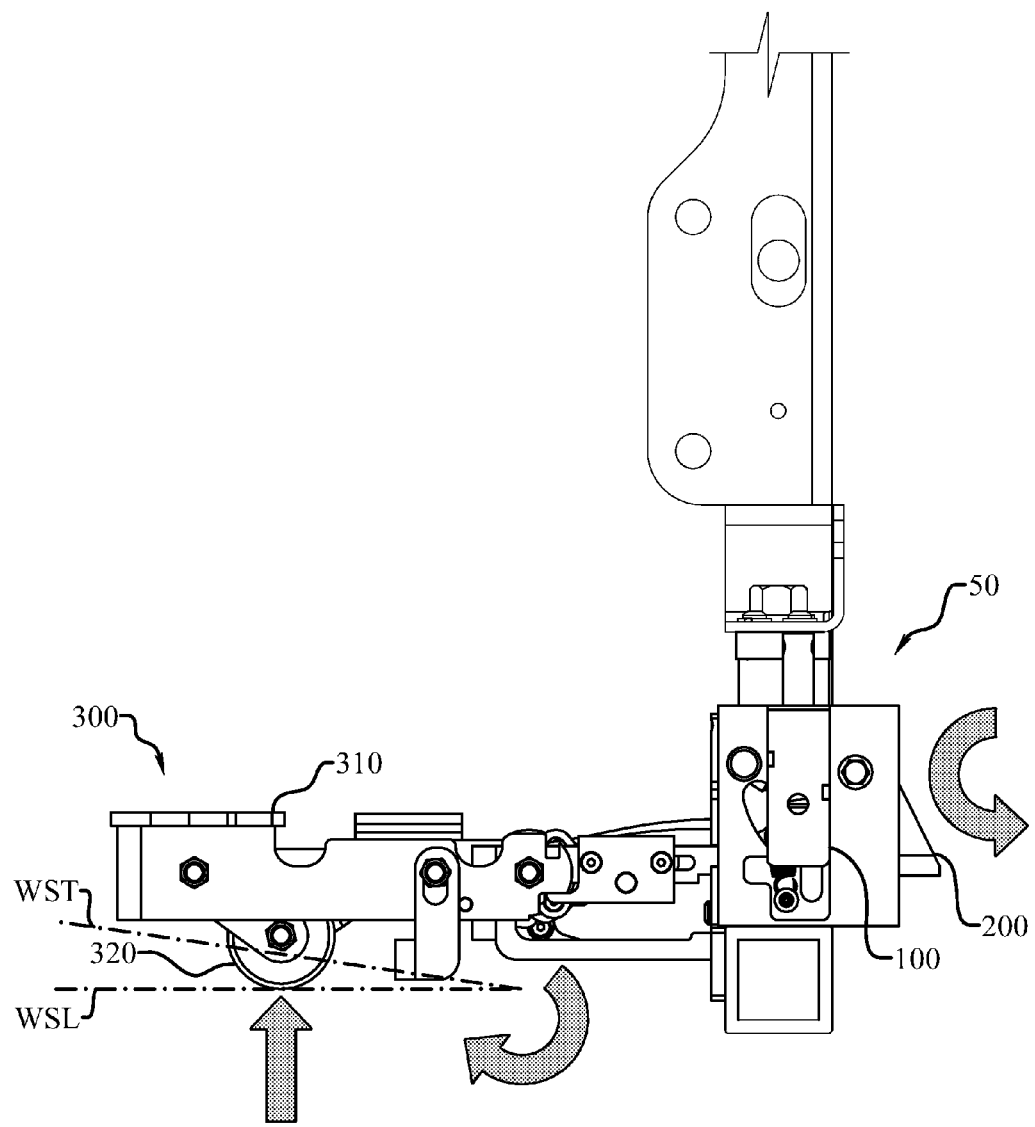
FIG. 4 is a left side elevational view of an embodiment of a lockout assembly, not to scale.
Figure 8:
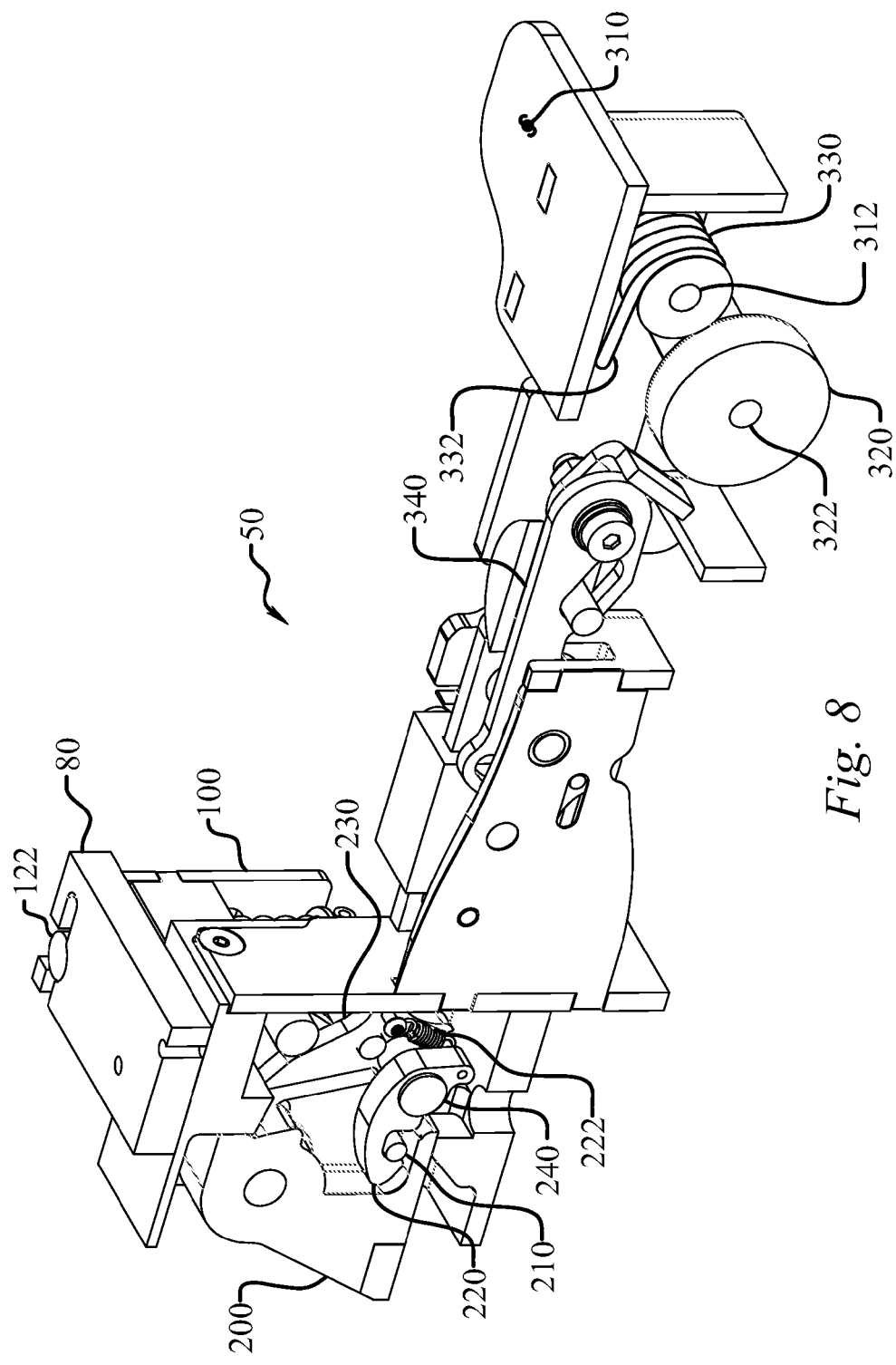
FIG. 8 is a partial cutaway, perspective view of an embodiment of a lockout assembly, not to scale.
Figure 9:
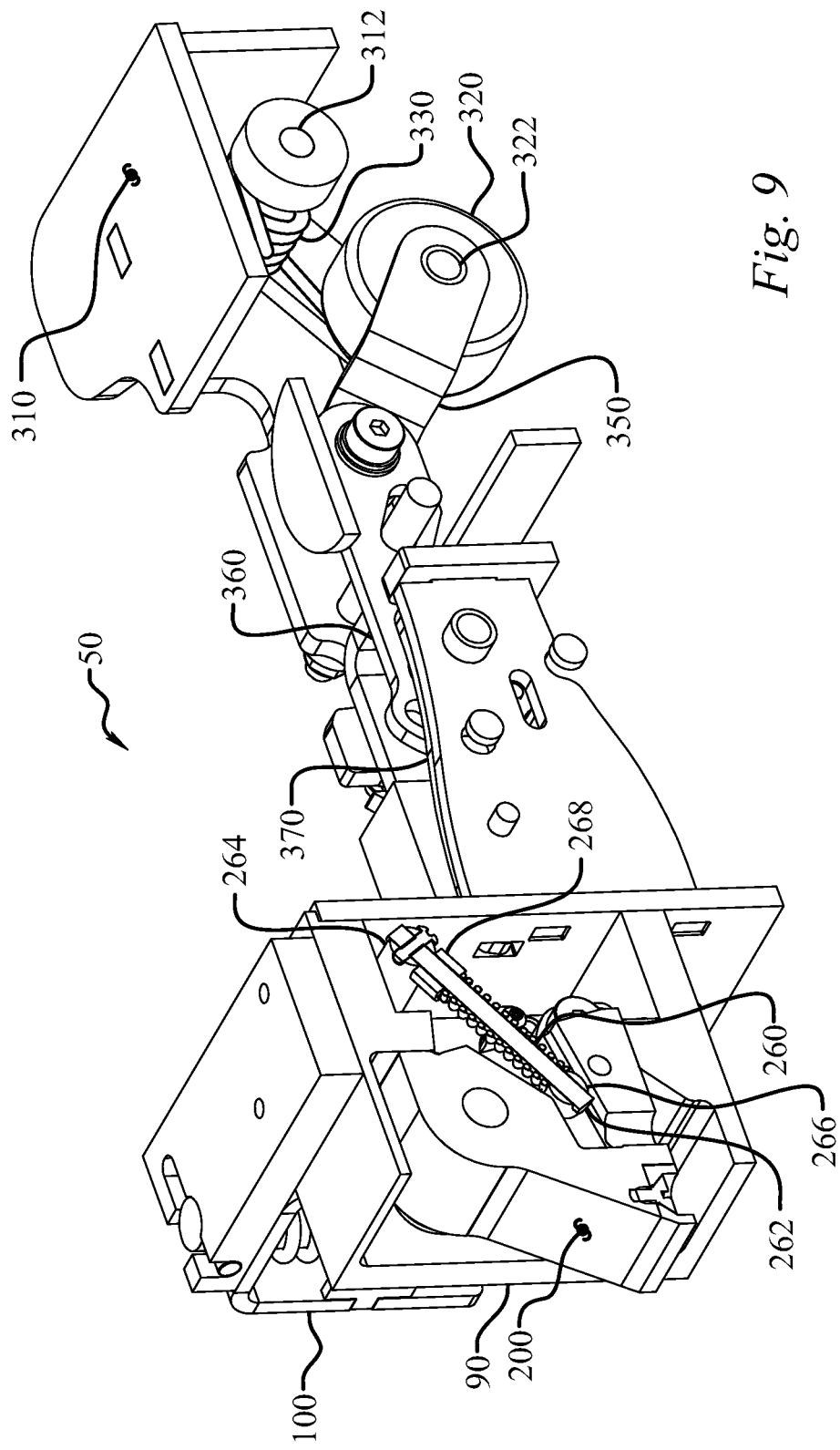
FIG. 9 is a partial cutaway, perspective view of an embodiment of a lockout assembly, not to scale.

As seen in FIGS. 3 and 4, the lockout assembly (50) has a retractable dog (200) for engaging one of the plurality of recesses spaced along the mast. The retractable dog (200) is connected to the housing (90) and is movable between an engaged position, seen in FIG. 13, and a disengaged position, seen in FIG. 12. The connection between the retractable dog (200) and the housing (90) may be a rotatable connection, a translational connection, or another type of connection as would be appreciated by those having skill in the art. The retractable dog (200) further includes a dog engagement pin (210), as seen in FIG. 8. For safety reasons, the retractable dog (200) is spring biased toward the engaged position. The biasing of the retractable dog (200) is achieved with a dog bias spring (260), as seen in FIG. 9. In one embodiment, the dog bias spring (260) may be mounted about a dog bias spring post (262) that may be connected to a dog bias spring support shaft (264). The dog bias spring support shaft (264) may be secured to the housing (90). As seen in FIG. 9, the dog bias spring (260) is positioned between a first sleeve (266) and a second sleeve (268), which are also mounted about the dog bias spring post (262). The first sleeve (266) is in communication with the retractable dog (200) and is slidably mounted about the dog bias spring post (262). As a result, when the retractable dog (200) moves from the engaged position to the disengaged position, the first sleeve (266) slides up the dog bias spring post (262) as the dog bias spring post (262) moves with the dog bias spring support (264) and the first sleeve (266) compresses the dog bias spring (260) against the second sleeve (268).

Figure 5:
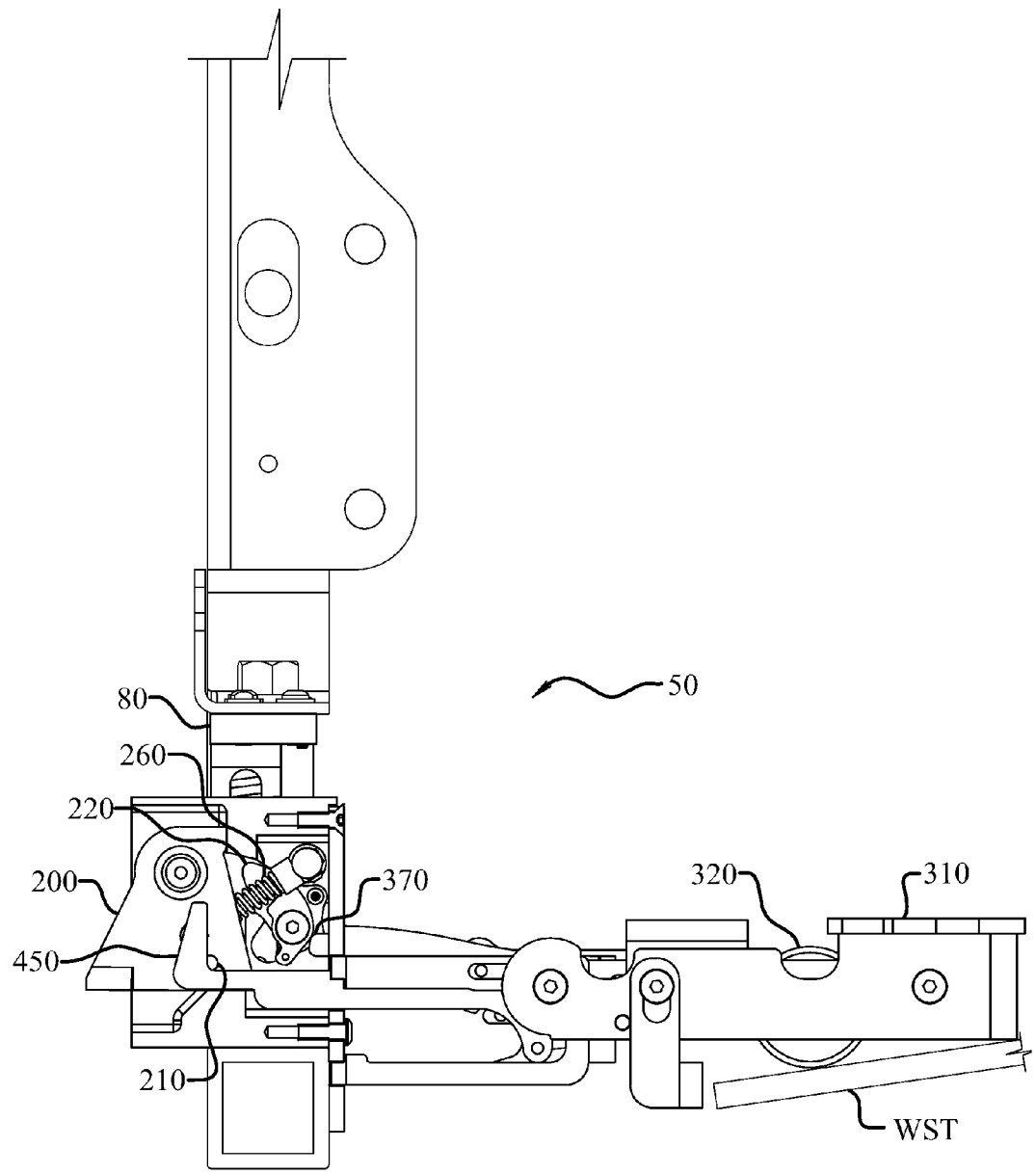
FIG. 5 is a partial cutaway, right side elevational view of an embodiment of a lockout assembly, not to scale.
Figure 6:
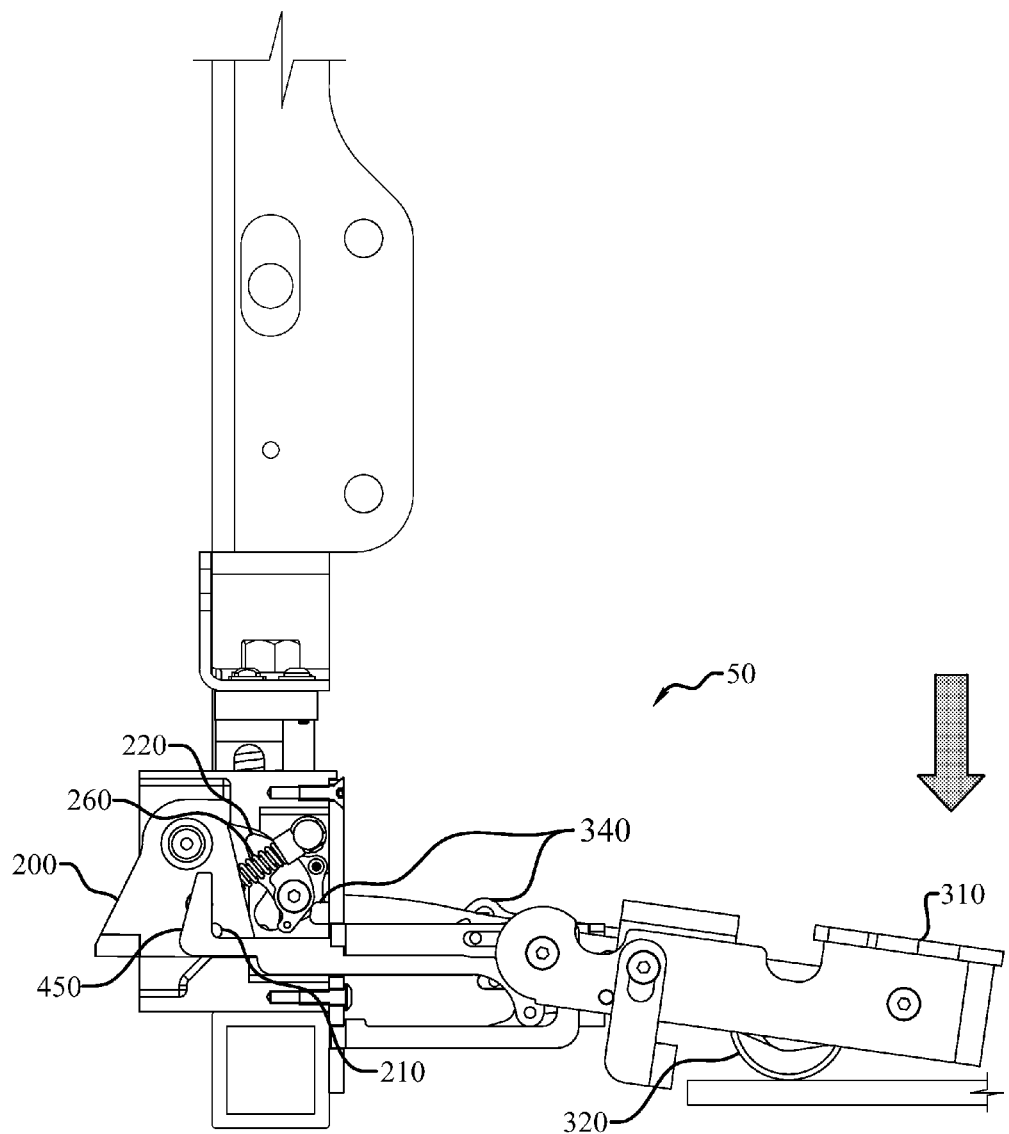
FIG. 6 is a partial cutaway, right side elevational view of an embodiment of a lockout assembly, not to scale.
Figure 7:
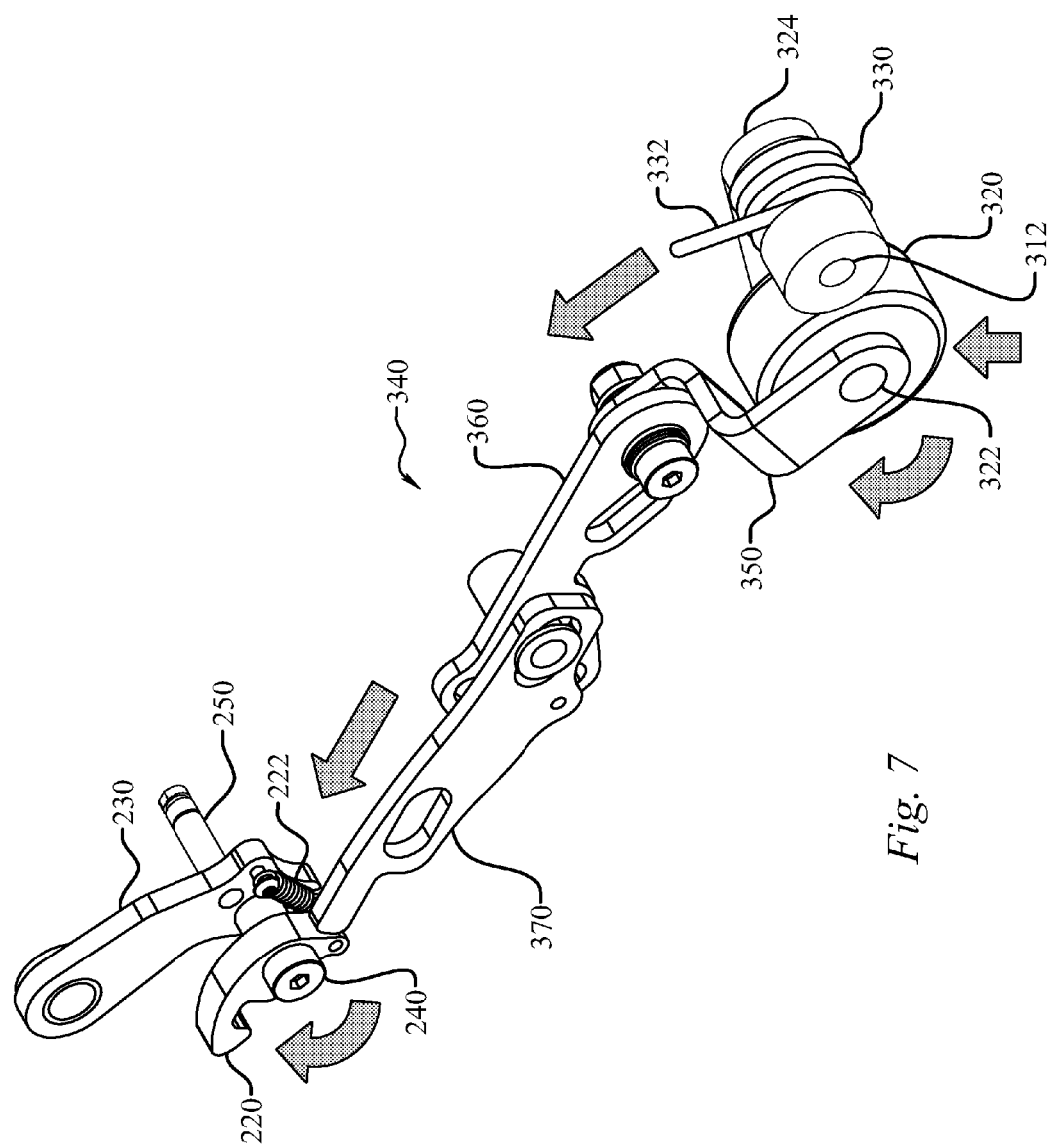
FIG. 7 is a perspective view of components of an embodiment of a lockout assembly, not to scale.

The next component of the lockout assembly (50) is a dog latch (220), as best seen in FIGS. 7 and 8. The dog latch (220) is configured to releasably engage the dog engagement pin (210). The releasable engagement between the dog latch (220) and the dog engagement pin (210) is accomplished by the ability of the dog latch (220) to rotate, which allows the dog latch (220) to move between a latched position, as seen in FIG. 8, and an unlatched position, as seen in FIGS. 5 and 6.

Figure 25B:
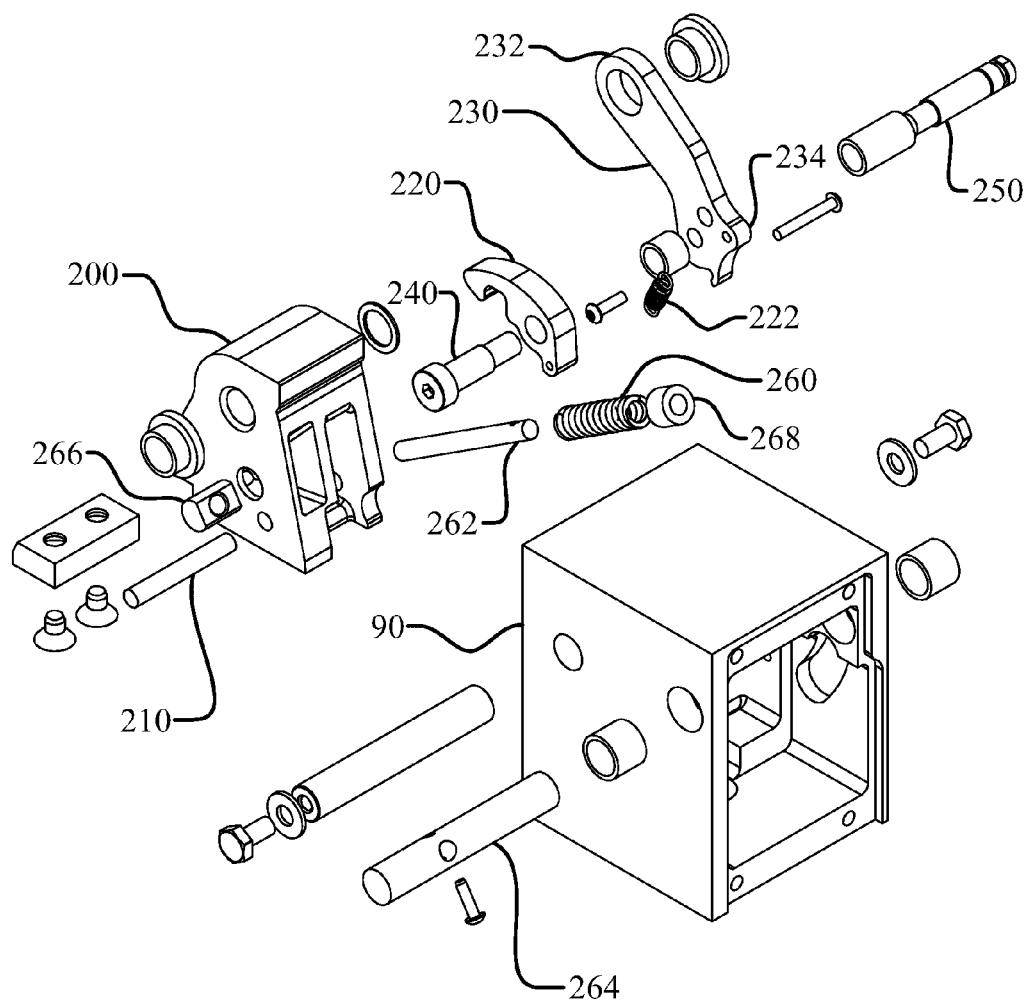
FIG. 25*b* is an exploded view of a portion of an embodiment of a lockout assembly, not to scale.

Referring now to FIGS. 7 and 25b, the lockout assembly (50) may further include a dog arm (230). The dog arm (230) has a dog arm proximal end (232) and a dog arm distal end (234). The dog arm (230) may be connected to the housing (90) at the dog arm proximal end (232). Additionally, the dog arm (230) may be connected to the dog latch (220) by a dog arm-to-latch connecting pin (240) at the dog arm distal end (234). As seen in FIG. 7, a dog arm-to-overload pin (250) is also connected to the dog arm (230) at the dog arm distal end (234), and a portion of the dog arm-to-overload pin (250) seats on the lifting cradle (110), seen well in FIG. 21. Although the dog arm-to-latch connecting pin (240) and the dog arm-to-overload pin (250) have been described as two separate components, it is envisioned that the dog arm-to-latch connecting pin (240) and the dog arm-to-overload pin (250) may be formed as a single dog latch-to-overload pin. In this particular embodiment, a portion of the dog latch-to-overload pin will connect the dog arm (230) to the dog latch (220), and a portion of the dog latch-to-overload pin will seat on the lifting cradle (110).

Figure 13:
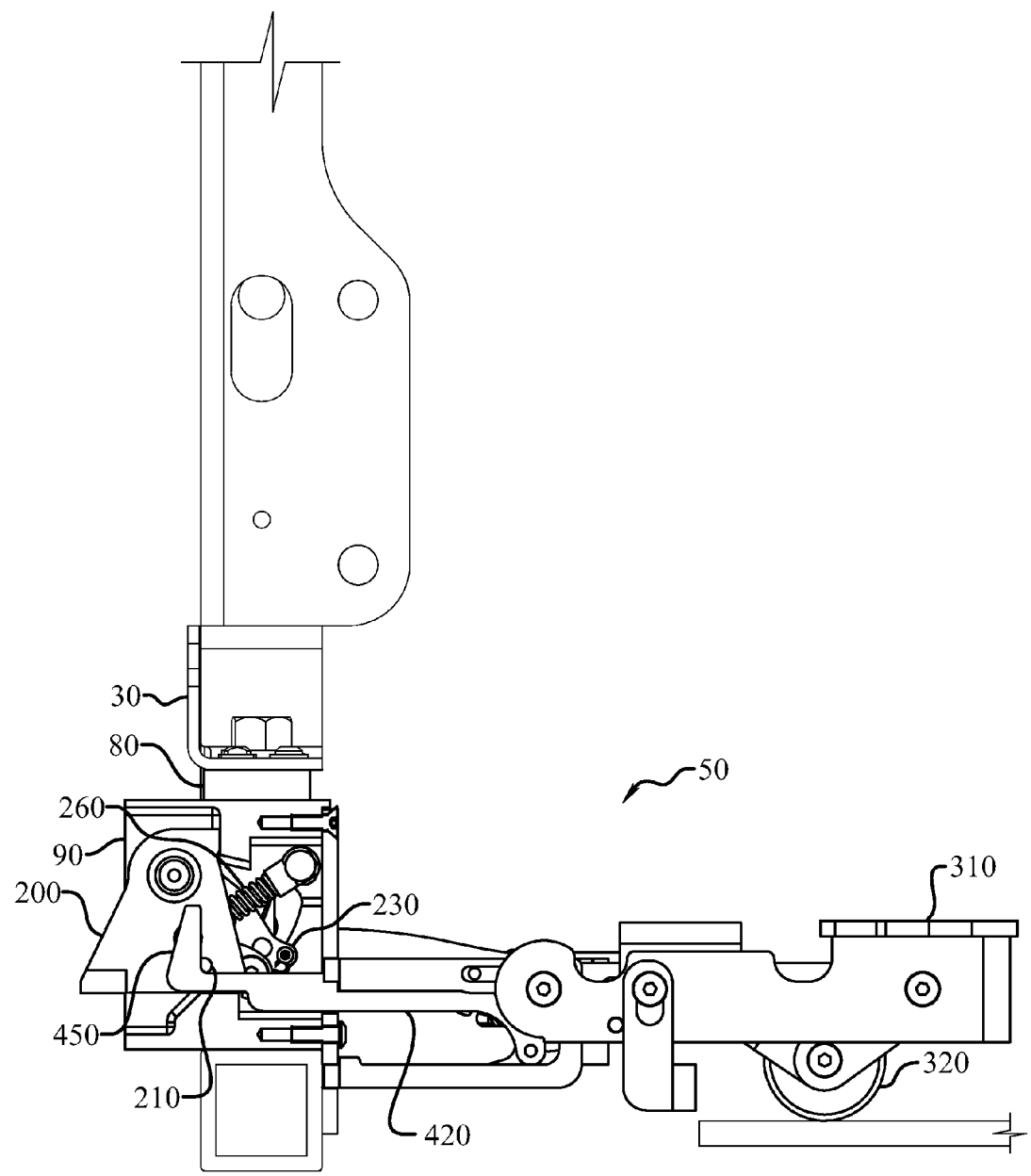
FIG. 13 is a partial cutaway, right side elevational view of an embodiment of a lockout assembly, not to scale.

As previously noted, the retractable dog (200) is spring biased toward the engaged position, as seen in FIG. 13. The engaged position is the default position of the retractable dog (200). This increases the safety of the lockout assembly (50) by allowing the retractable dog (200) to quickly transition to the engaged position to engage a recess on the mast to lock the mast guided working surface in place. For example, the lockout assembly (50) is configured to prevent free falling during a slack rope condition. When a slack rope condition occurs, the inner rollcase (30) translates downward along with the upper connection plate (80) and the overload mechanism (100). When the overload mechanism (100) is lowered, the retractable dog (200) is allowed to spring into the engaged position and engage a recess on the mast. Importantly, the retractable dog (200) will remain in the engaged position unless a deliberate and intentional action is taken to move the retractable dog (200) to the disengaged position.

Figure 12:
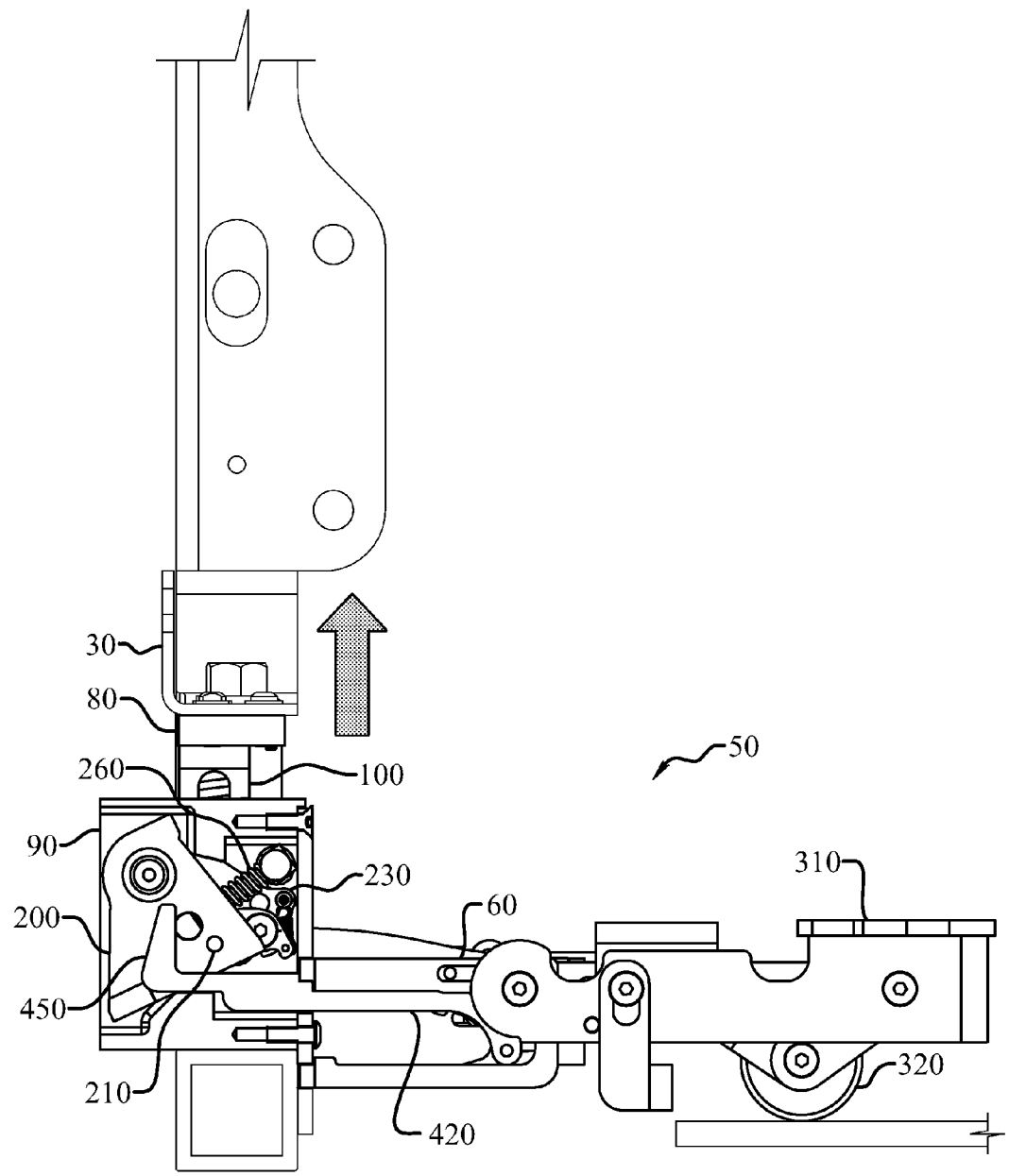
FIG. 12 is a partial cutaway, right side elevational view of an embodiment of a lockout assembly, not to scale.

One such deliberate and intentional action occurs when a user operates the lifting means to raise or lower the mast guided working surface along the mast. As mentioned above, when the lifting means is operated, the inner rollcase (30) translates upward with respect to the outer rollcase (20). The upward translation of the inner rollcase (30) raises the upper connection plate (80) and the overload mechanism (100), as noted by the directional arrow in FIG. 12. As the overload mechanism (100) is raised upward with respect to the housing (90), the lifting cradle (110) bears on the dog arm-to-overload pin (250) causing the dog arm (230) to rotate, which moves the dog arm-to-overload pin (250) in an upward and rearward direction within a slot formed in the housing (90), as seen in FIG. 21. When the dog arm (230) rotates, the dog latch (220), which is connected to the dog arm (230) by the dog arm-to-latch connecting pin (240), moves with the dog arm (230) and exerts a force on the dog engagement pin (210), perhaps best seen in FIG. 8. As a result of the force exerted on the dog engagement pin (210) by the dog latch (220), the retractable dog (200) is caused to move from the engaged position, as seen in FIG. 13, to the disengaged position, as seen in FIG. 12. When the retractable dog (200) is in the disengaged position, the mast guided working surface may be safely raised or lowered along the mast.

After the user raises or lowers the mast guided working surface to reach a desired height on the mast, the user may utilize the lockout assembly (50) to releasably lock the mast guided working surface at the desired height. With reference to FIG. 16, the lockout assembly (50) may further include a dog release device (300), which operates to move the retractable dog (200) from the disengaged position to the engaged position by causing the dog latch (220) to move from the latched position to the unlatched position so that the dog latch (220) releases the dog engagement pin (210), as will be appreciated with reference to FIGS. 7 and 8.

Figure 10:
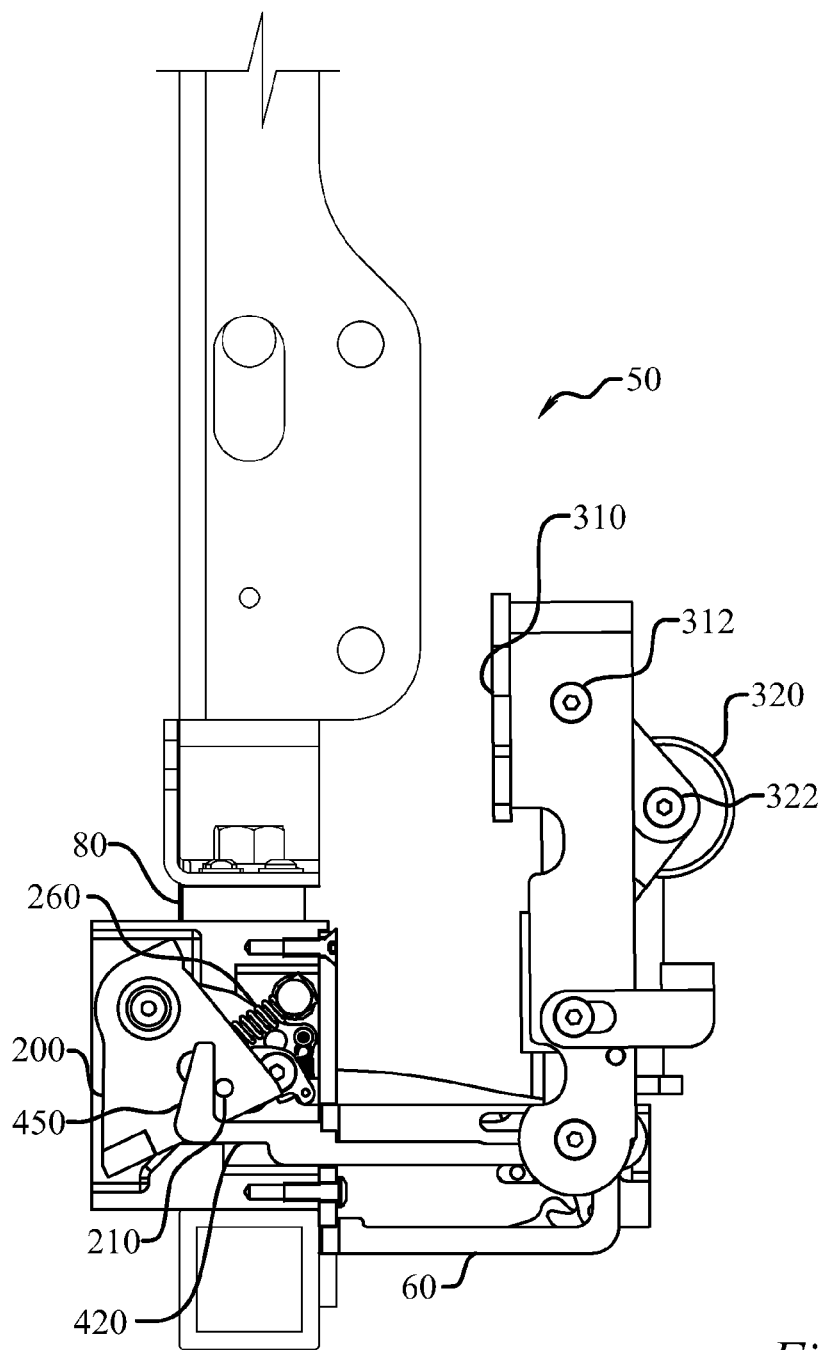
FIG. 10 is a partial cutaway, right side elevational view of an embodiment of a lockout assembly, not to scale.
Figure 17:
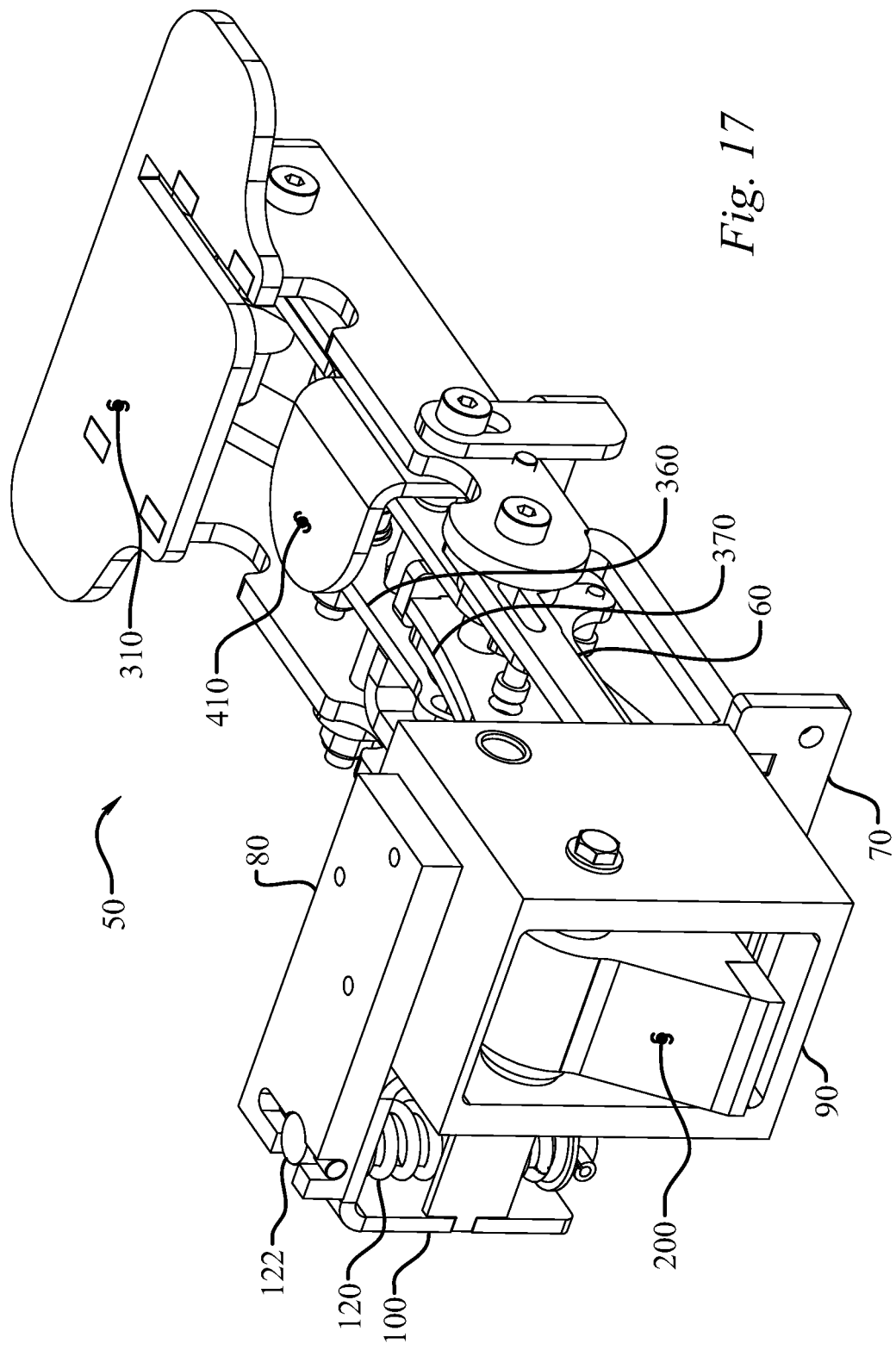
FIG. 17 is a perspective view of an embodiment of a lockout assembly, not to scale.
Figure 18:
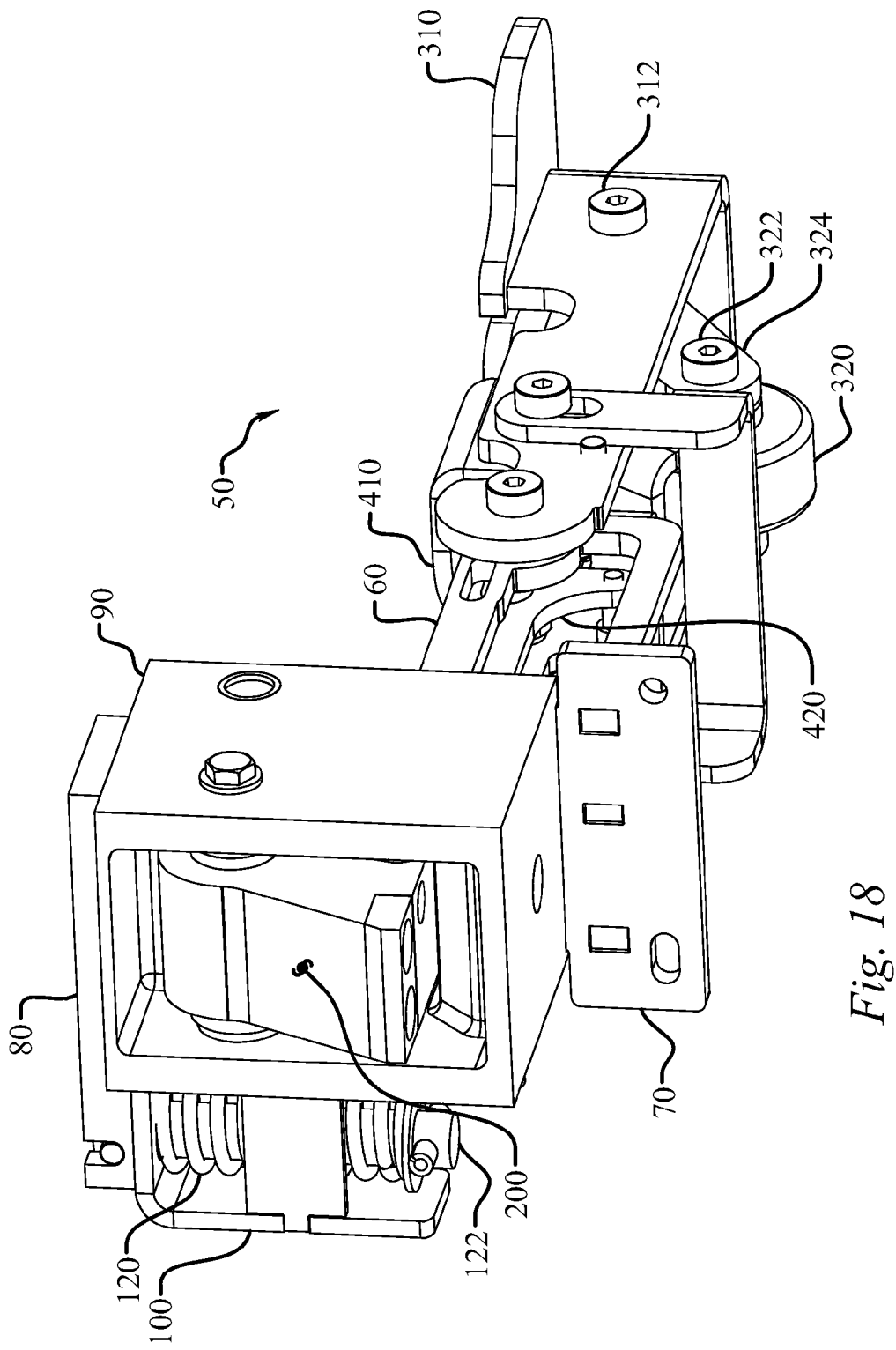
FIG. 18 is a perspective view of an embodiment of a lockout assembly, not to scale.
Figure 19:
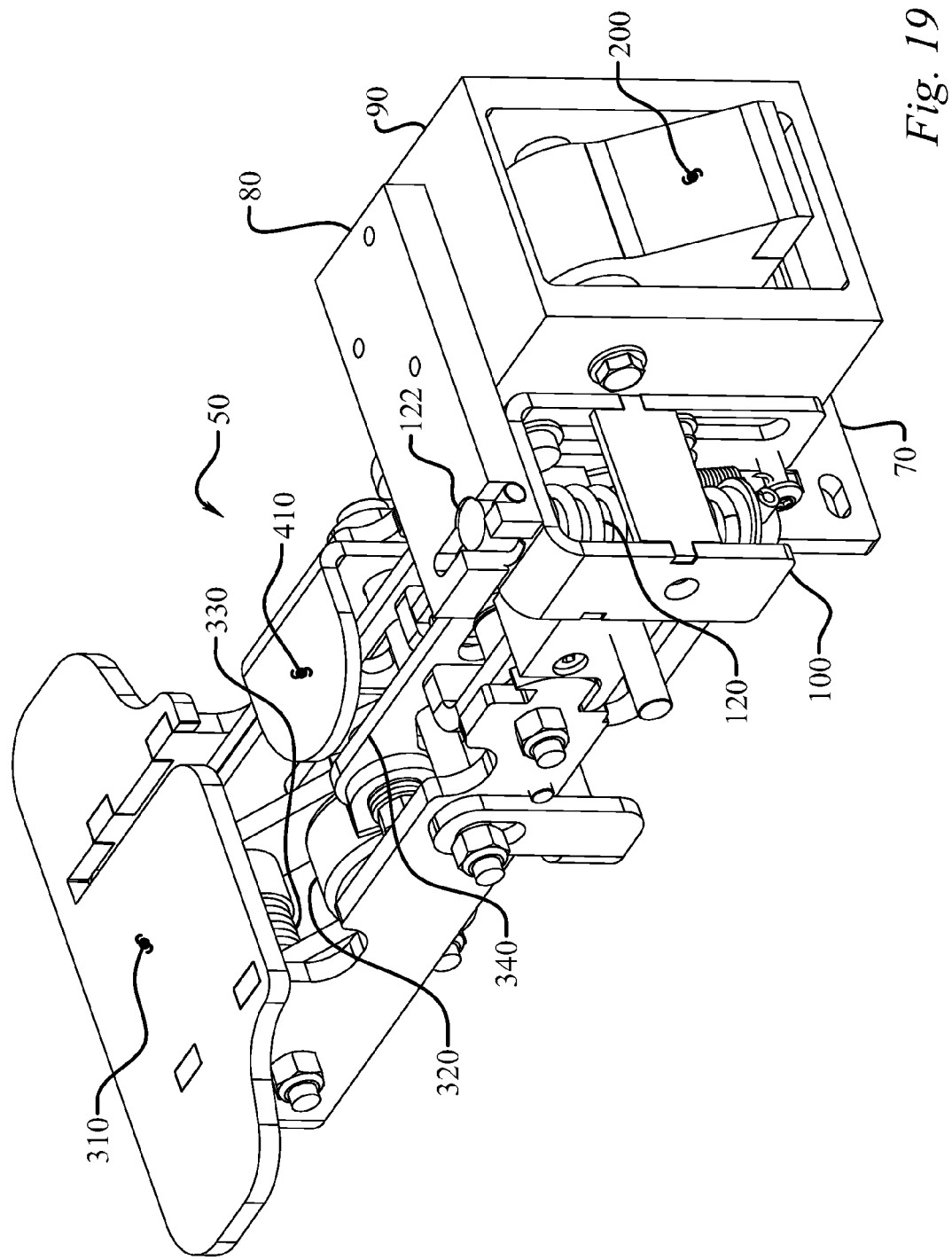
FIG. 19 is a perspective view of an embodiment of a lockout assembly, not to scale.
Figure 26:
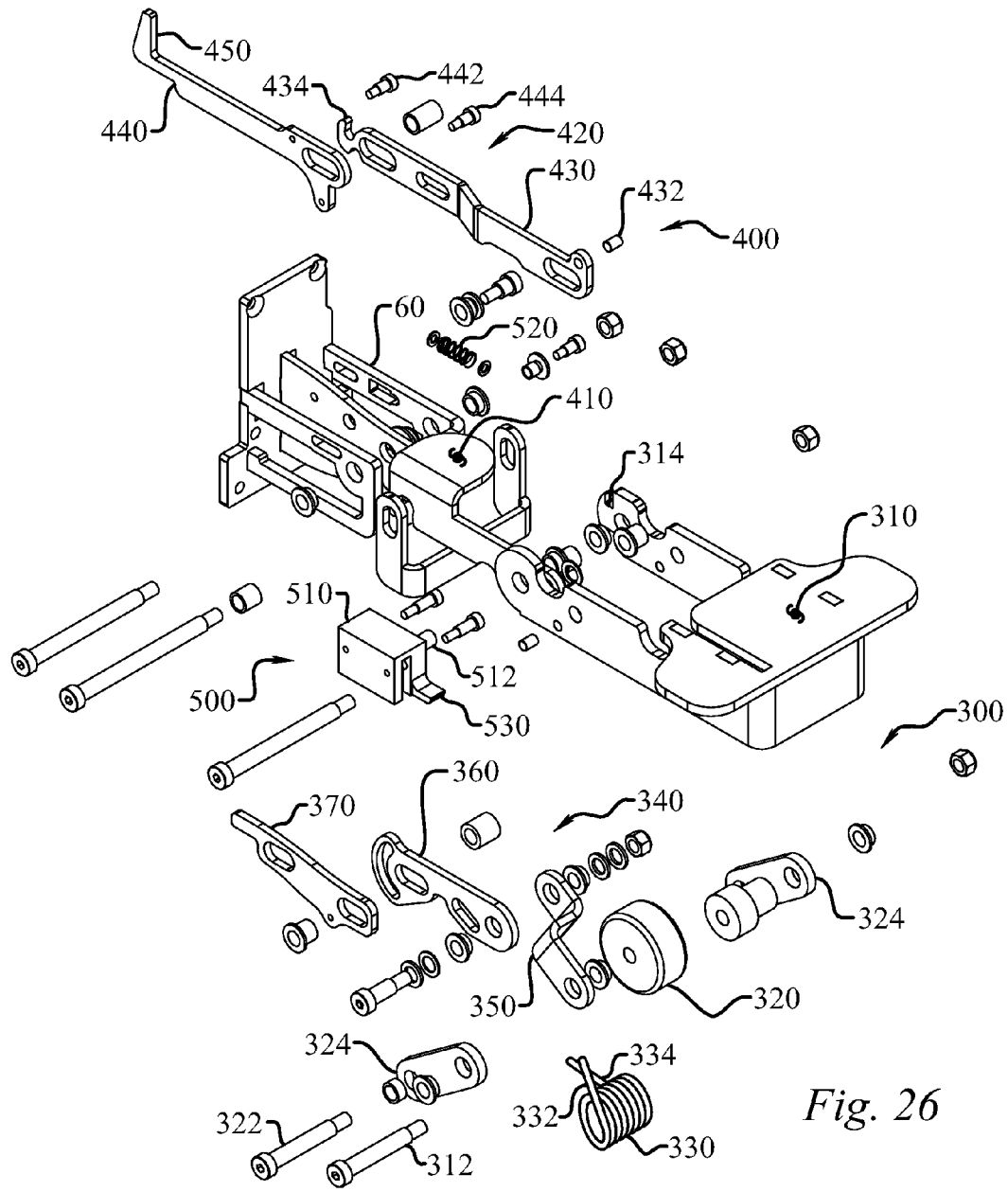
FIG. 26 is an exploded view of a portion of an embodiment of a lockout assembly, not to scale.

The dog release device (300) includes a release pedal (310), seen in FIG. 17, rotatably connected to the rear frame member (60) of the lockout assembly (50). The rotatable connection allows the release pedal (310) to move between a horizontal position, as seen in FIG. 12, and a vertical position, as seen in FIG. 10. Additionally, the dog release device (300) includes a release wheel (320) journaled about a release wheel axle (322), as seen in FIG. 3. The release wheel axle (322) is secured to connecting arms (324) that are disposed about a mounting shaft (312), which is connected to the release pedal (310), best seen in FIG. 23. As seen in FIGS. 8 and 9, the dog release device (300) further includes a release spring (330) journaled about the mounting shaft (312). The release spring (330) has a release spring first arm (332) and a release spring second arm (334), as best seen in FIG. 26. A portion of the release spring first arm (332) bears against a portion of the release pedal (310) and a portion of the release spring second arm (334) bears against a portion of the release wheel axle (322). The final component of the dog release device (300) is a latch release linkage (340), seen well in FIG. 7. The latch release linkage (340) is connected to the release wheel axle (322) and, in one particular embodiment, may include an intermediate latch release link (350) joined to a first latch release link (360), which is joined to a second latch release link (370). Although this particular embodiment of the latch release linkage (340) includes three separate links, those with skill in the art will recognize that a higher or lower number of links may be utilized. The latch release linkage (340) is configured to be movable between a retracted position and an extended position, as indicated by the directional arrows in FIG. 7.

When the mast guided working surface reaches a desired height on the mast, the user may depress the release pedal (310), as shown by the directional arrow in FIG. 6, to manually activate the dog release device (300). With reference now to FIG. 7, in operation the downward force applied to the release pedal (310) changes the state of the release spring (330) and moves the release wheel (320) in a forward direction. Changing the state of a spring as used herein simply means moving a portion of the spring and is used so as to not limit a spring to being in compression or tension. Thus, a spring in tension can have a portion moved so that it remains in tension but its state has been changed, and vice versa for a spring in compression. Similarly, a spring that is installed with acting spring force may have its state changed by movement causing the spring to be in either compression or tension. When the release wheel (320) moves forward it causes the latch release linkage (340) to transition from the retracted position to the extended position. In the extended position, a portion of the latch release linkage (340), i.e., the second latch release link (370), contacts a portion of the dog latch (220), which causes the dog latch (220) to rotate from the latched position to the unlatched position, as seen in FIG. 6. When the dog latch (220) rotates to the unlatched position it releases the dog engagement pin (210), which allows the dog bias spring (260) to bias the retractable dog (200) from the disengaged position to the engaged position, hence the release pedal (310) causes the dog latch (220) to release the dog engagement pin (210) that allows the retractable dog (200) to move into the engaged position. In the engaged position, the retractable dog (200) is able to engage a recess on the mast to lock the mast guided working surface at the desired height.

In addition to being activated manually, the dog release device (300) is also configured to operate automatically as a safety feature. The automatic operation is triggered when the mast guided working surface moves from a level condition (WSL) to a tilted condition (WST), as seen in FIGS. 4 and 5. In one particular embodiment, the tilted condition (WST) to trigger automatic operation of the dog release device (300) is achieved when the mast guided working surface tilts at an angle of about 12 degrees. When the mast guided working surface reaches such a tilted condition (WST), a portion of the mast guided working surface will exert an upward force on the release wheel (320) to change the state of the release spring (330) and move the release wheel (320) in a forward direction, as seen in FIG. 4. From this point, the mechanism for the automatic operation of the dog release device (300) proceeds in the exact same manner as the manual operation of the dog release device (300) described above. As a result, if the mast guided working surface reaches the tilted condition (WST), the dog release device (300) will automatically operate to move the retractable dog (200) from the disengaged position to the engaged position. In the engaged position, the retractable dog (200) will spring into the first available recess on the mast to prevent the mast guided working surface from tilting further or falling.

Although reference to a specific tilted condition (WST) has been discussed above, it should be noted that the lockout assembly (50) may be configured so that automatic operation of the dog release device (300) will occur when the mast guided working surface tilts at an angle that is less than about 12 degrees or greater than about 12 degrees. In the embodiment discussed above, the release wheel (320) has a diameter of about 2 inches, which results in the automatic operation of the dog release device (300) when the mast guided working surface tilts at an angle of about 12 degrees. However, by increasing the diameter of the release wheel (320), the angle at which the mast guided working surface must tilt to trigger automatic operation of the dog release device (300) decreases. Similarly, by decreasing the diameter of the release wheel (320), the angle the angle at which the mast guided working surface must tilt to trigger automatic operation of the dog release device (300) increases. As a result, the lockout assembly (50) may be configured to automatically lock the mast guided working surface to the mast when a desired tilted condition (WST) has been reached.

Any time the dog release device (300) has been operated, whether manually or automatically, the dog latch (220) will need to return to the latched position and reengage the dog engagement pin (210). The return to the latched position may be accomplished by a dog latch return spring (222). As seen in FIG. 7, the dog latch return spring (222) is connected to the dog latch (220) and the dog arm (230). As can be appreciated, the dog latch return spring (222) biases the dog latch (220) toward the latched position. For example, when the second latch release link (370) contacts the dog latch (220) and causes the dog latch (220) to rotate to the unlatched position, the rotation of the dog latch (220) will act on the dog latch return spring (222) and change the state of the dog latch return spring (222). When the second latch release link (370) is retracted and no longer in contact with the dog latch (220), the dog latch return spring (222) will recoil to its original state and cause the dog latch (220) to rotate back to the latched position. At this point, the retractable dog (200) will be in the engaged position, and the dog latch (220), although in the latched position, will be separated from the dog engagement pin (210). This is due to the overload mechanism (100) still being in a raised position with the lifting cradle (110) bearing upward on the dog arm-to-overload pin (250), which holds the dog arm (230) and the connected dog latch (220) in a raised position.

In order to bring the dog latch (220) back into engagement with the dog engagement pin (210), the overload mechanism (100) must be lowered. For example, when the retractable dog (200) is in the engaged position and extends into a recess of the mast, the inner rollcase (30) must be lowered to cause the upper connection plate (80) and overload mechanism (100) to lower. As seen in FIG. 21, the dog arm-to-overload pin (250) is connected to the overload mechanism (100) by a dog latch return spring (236). The dog latch return spring (236) tends to urge the dog arm-to-overload pin (250) toward the lifting cradle (110) of the overload mechanism (100). As a result, when the overload mechanism (100) is lowered, the dog latch return spring (236) acts upon the dog arm-to-overload pin (250) to cause the dog arm (230) to rotate downward, which lowers the dog latch (220) into engagement with the dog engagement pin (210).

Figure 11:
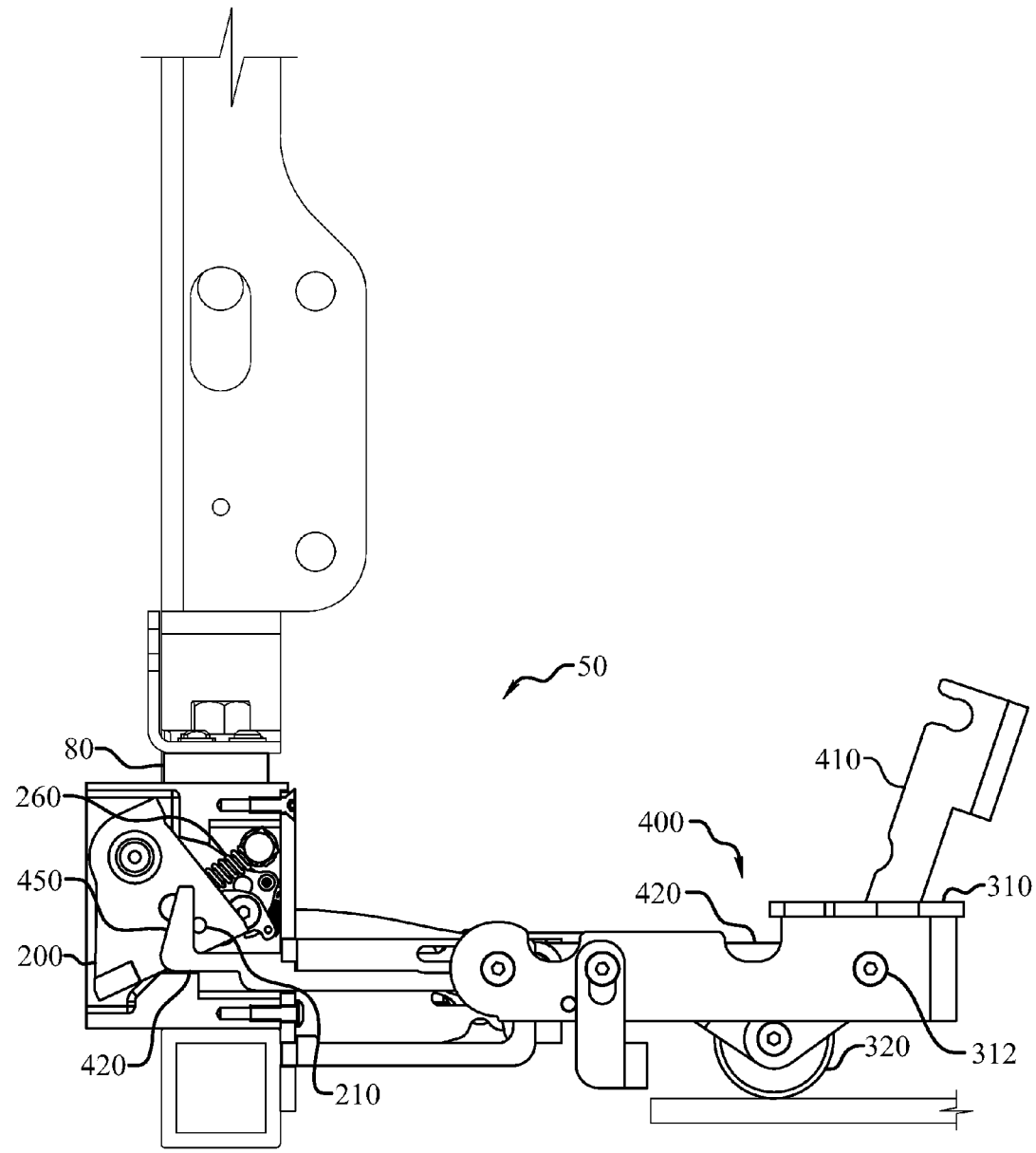
FIG. 11 is a partial cutaway, right side elevational view of an embodiment of a lockout assembly, not to scale.

In one embodiment, the lockout assembly (50) may further include a dog emergency release device (400), as seen in FIG. 21. In operation, the dog emergency release device (400) moves the retractable dog (200) from the engaged position to the disengaged position, which is illustrated in FIG. 11. In one particular embodiment, the dog emergency release device (400) includes an emergency release lever (410) that is rotatably journaled about the mounting shaft (312), seen well in FIG. 24. The rotatable connection allows the emergency release lever (410) to move between a resting position, seen in FIG. 24, and an operative position, seen in FIG. 11. With continued reference to FIG. 11, the dog emergency release device (400) also includes an emergency release linkage (420) having an emergency release arm (450). As can be appreciated with reference to FIGS. 23 and 26, the emergency release linkage (420) is connected to the mounting shaft (312) and is movable between an inactive position, as seen in FIG. 13, and an active position, as shown in FIG. 11.

The dog emergency release device (400) acts as a manual override in the event that the lockout assembly (50) malfunctions and the retractable dog (200) is stuck in the engaged position, which would prevent lowering of the mast guided working surface. To utilize the dog emergency release device (400) the user will need to slightly raise the mast guided working surface to take pressure off of the retractable dog (200). Next, the user may move the emergency release lever (410) from the resting position to the operative position, as seen in FIG. 11. As the emergency release lever (410) is moved to the operative position it will engage a portion of the emergency release linkage (420). When the emergency release lever (410) engages the emergency release linkage (420), the engagement causes the emergency release linkage (420) to move from the inactive position to the active position. As seen in FIG. 11, when the emergency release linkage (420) is in the active position, the emergency release arm (450) engages and applies a force on the dog engagement pin (210) that causes the retractable dog (200) to move from the engaged position to the disengaged position. With the retractable dog (200) in the disengaged position, the user may safely lower the mast guided working surface.

Figure 24:
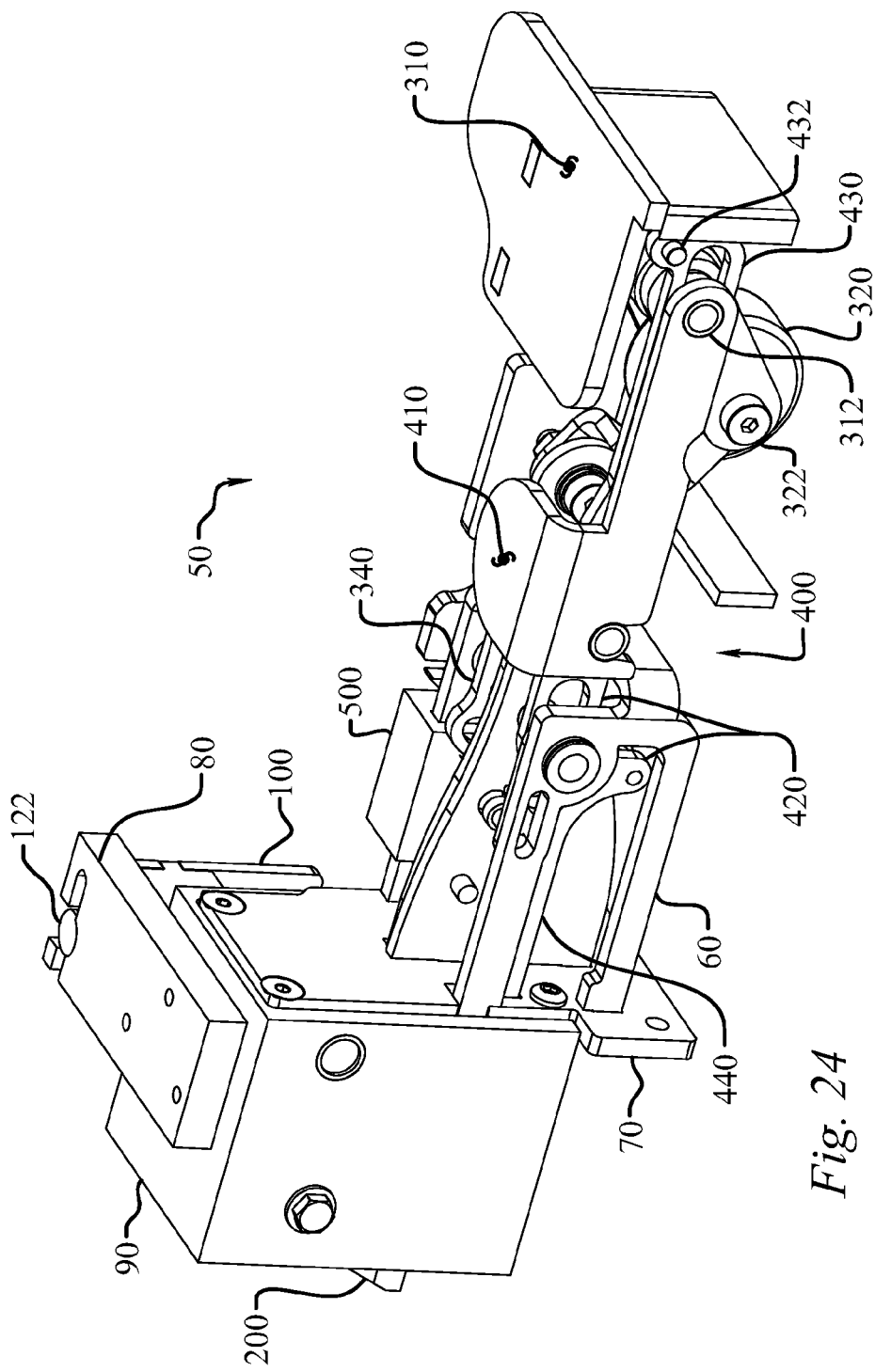
FIG. 24 is a partial cutaway, perspective view of an embodiment of a lockout assembly, not to scale.

In one particular embodiment, the emergency release linkage (420) may comprise a first emergency release link (430) and a second emergency release link (440), as seen in FIG. 26. The first emergency release link (430) may include a first emergency release link pin (432) and a first emergency release link arm (434). The second emergency release link (440) may have a second emergency release link connecting pin (442) and a second emergency release link locking pin (444). As may be appreciated with reference to FIG. 26, the first emergency release link arm (434) is configured to engage the second emergency release link connecting pin (442), as well as the second emergency release link locking pin (444). Referring now to FIG. 24, in this specific embodiment, when the emergency release lever (410) is moved to the operative position, a portion of the emergency release lever (410) will engage and exert a force on the first emergency release link pin (432). The force will cause the first emergency release link (430) and the second emergency release link (440), via the engagement between the first emergency release link arm (434) and the second emergency release link connecting pin (442), to move rearward toward the active position. With reference to FIGS. 11 and 26, when the first emergency release link (430) and the second emergency release link (440) move toward the active position, the emergency release arm (450) bears against the dog engagement pin (210) and causes the retractable dog (200) to move from the engaged position to the disengaged position.

Figure 22:
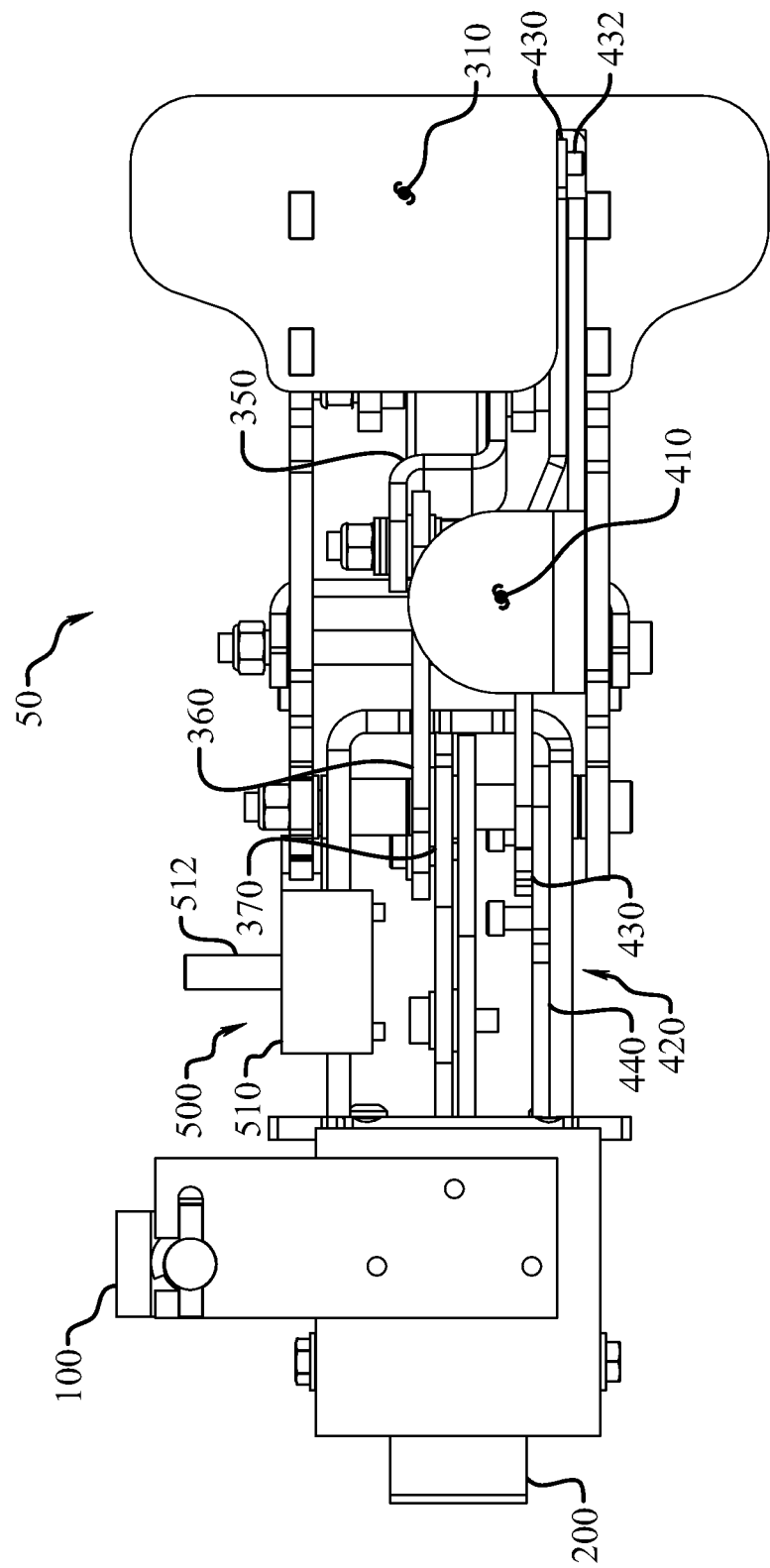
FIG. 22 is a top plan view of an embodiment of a lockout assembly, not to scale.
Figure 23:
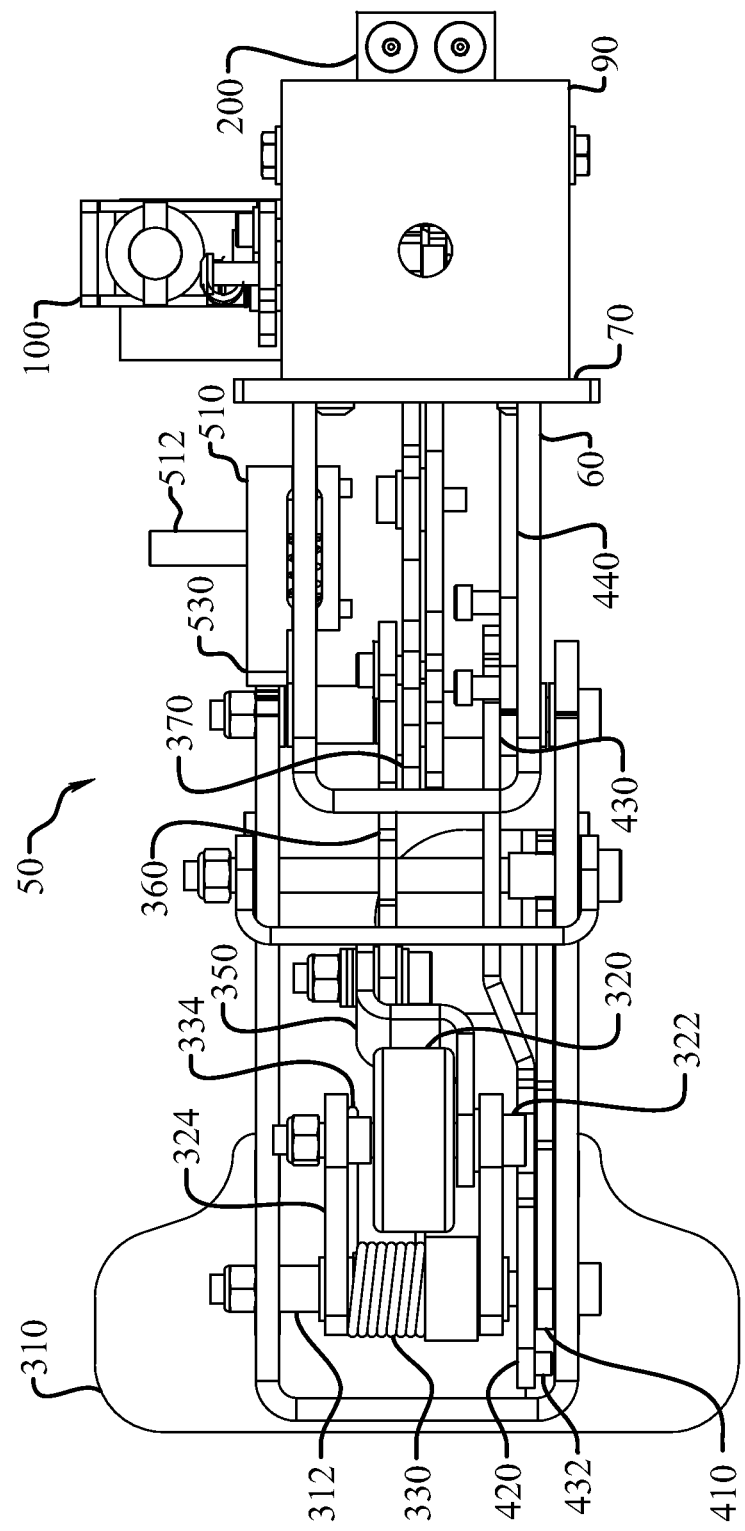
FIG. 23 is a bottom plan view of an embodiment of a lockout assembly, not to scale.

In another embodiment, the lockout assembly (50) may further include a lockout assembly locking device (500), as seen in FIGS. 22, 23 and 26. The lockout assembly locking device (500) has a lock housing (510) that is slidably connected to the rear frame member (60). The lock housing (510) further includes a gripping handle (512) that allows a user to move the lock housing (510) from a locked position to an unlocked position. As seen in FIG. 3, a locking projection (530) extends from the lock housing (510) and is configured to engage a portion of the release pedal (310) to prevent the release pedal (310) from rotating from the horizontal position to the vertical position when the lock housing (510) is in the locked position. In one embodiment, the lock housing (510) is spring biased toward the locked position. As seen in FIG. 26, a lock biasing spring (520) may be placed into a slot formed in the rear frame member (60) on which the lock housing (510) is disposed. Fasteners pass through slots on the rear frame member (60) to slidably secure the lock housing (510). As can be appreciated, when the lock housing (510) is forced to move from the locked position to the unlocked position, one of the fasteners will act on the lock biasing spring (520) to change its state. When the force applied to move the lock housing (510) to the unlocked position is removed, the lock biasing spring (520) will recoil to its original state and bias the lock housing (510) back to the locked position.

Referring now to FIGS. 3 and 10, when a user moves the lock housing (510) from the locked position to the unlocked position, the release pedal (310) may be rotated to the vertical position, as seen in FIG. 10. When the release pedal (310) is rotated to the vertical position, the rotation causes a portion of the emergency release linkage (420) to move to the active position. As discussed above, when the emergency release linkage (420) moves to the active position, the emergency release arm (450) engages and applies a force on the dog engagement pin (210) that causes the retractable dog (200) to move from the engaged position to the disengaged position. In a specific embodiment, as the release pedal (310) is being rotated to the vertical position, the first emergency release link (430) rotates simultaneously with the release pedal (310) and brings the first emergency release link arm (434) into engagement with the second emergency release link locking pin (444). Continued rotation of the release pedal (310) to the vertical position causes the first emergency release link arm (434) to exert a force on the second emergency release link locking pin (444), which moves the second emergency release link (440) in a rearward direction to the active position. As the second emergency release link (440) moves to the active position, the emergency release arm (450) engages and applies a force on the dog engagement pin (210) that moves the retractable dog (200) from the engaged position to the disengaged position, as seen in FIG. 10.

With the release pedal (310) in the vertical position, the lock housing (510) may be moved from the unlocked position to the locked position, which allows the locking projection (530) to engage a retaining slot (314), seen in FIGS. 3 and 26, on the release pedal (310). The engagement between the locking projection (530) and the retaining slot (314) maintains the release pedal (310) in the vertical position and also retains the retractable dog (200) in the disengaged position. By having the release pedal (310) locked in the vertical position and the retractable dog (200) locked in the disengaged position, the lockout assembly (50) is easier to store or transport and is less likely to be damaged. Moreover, when the lockout assembly (50) is being installed on the mast, or removed from the mast, the retractable dog (200) must be in the disengaged position. The lockout assembly locking device (500) provides a convenient and easily operable means for retaining the retractable dog (200) in the disengaged position for installation and removal purposes.

Figure 14:
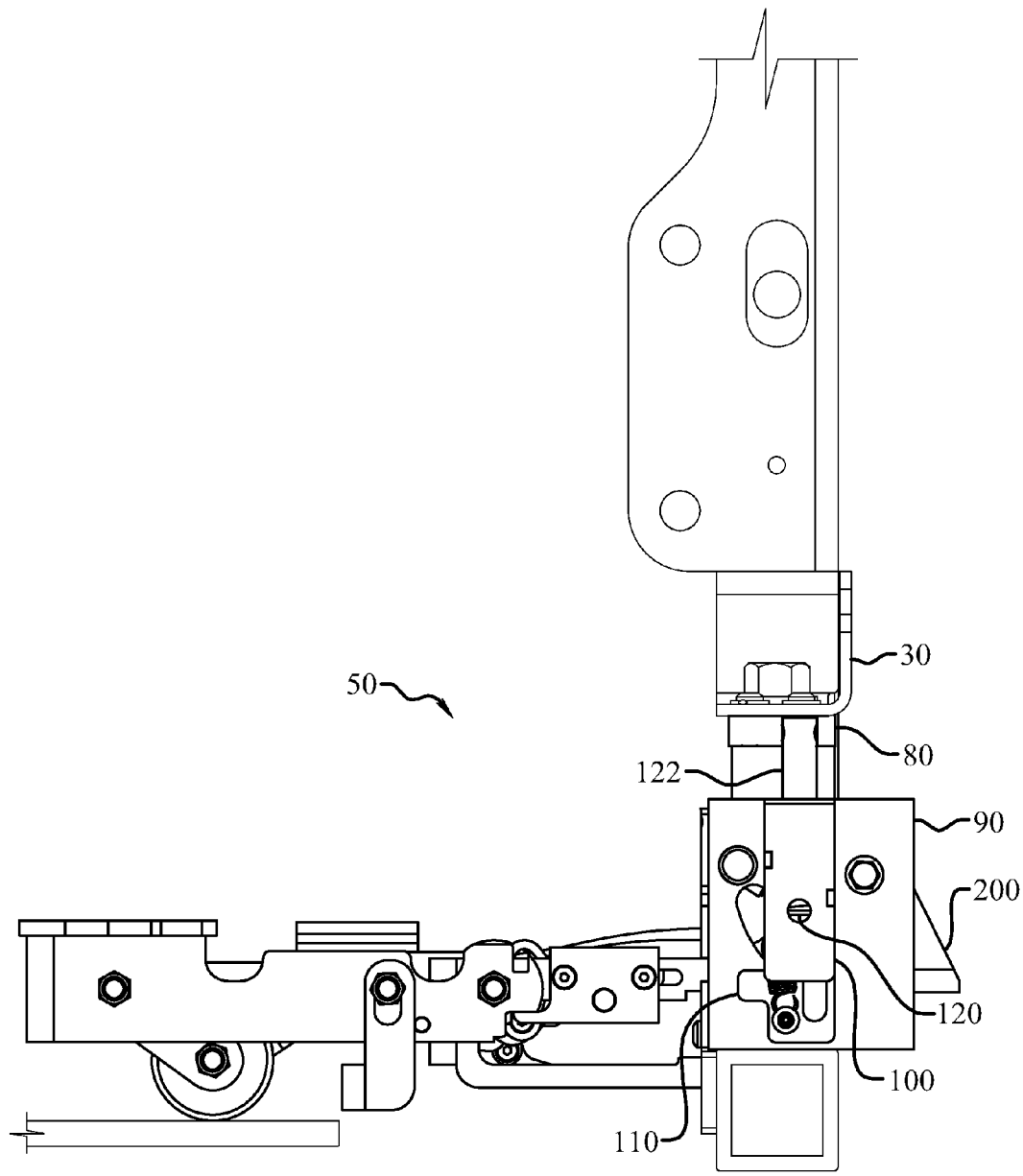
FIG. 14 is a left side elevational view of an embodiment of a lockout assembly, not to scale.
Figure 15:
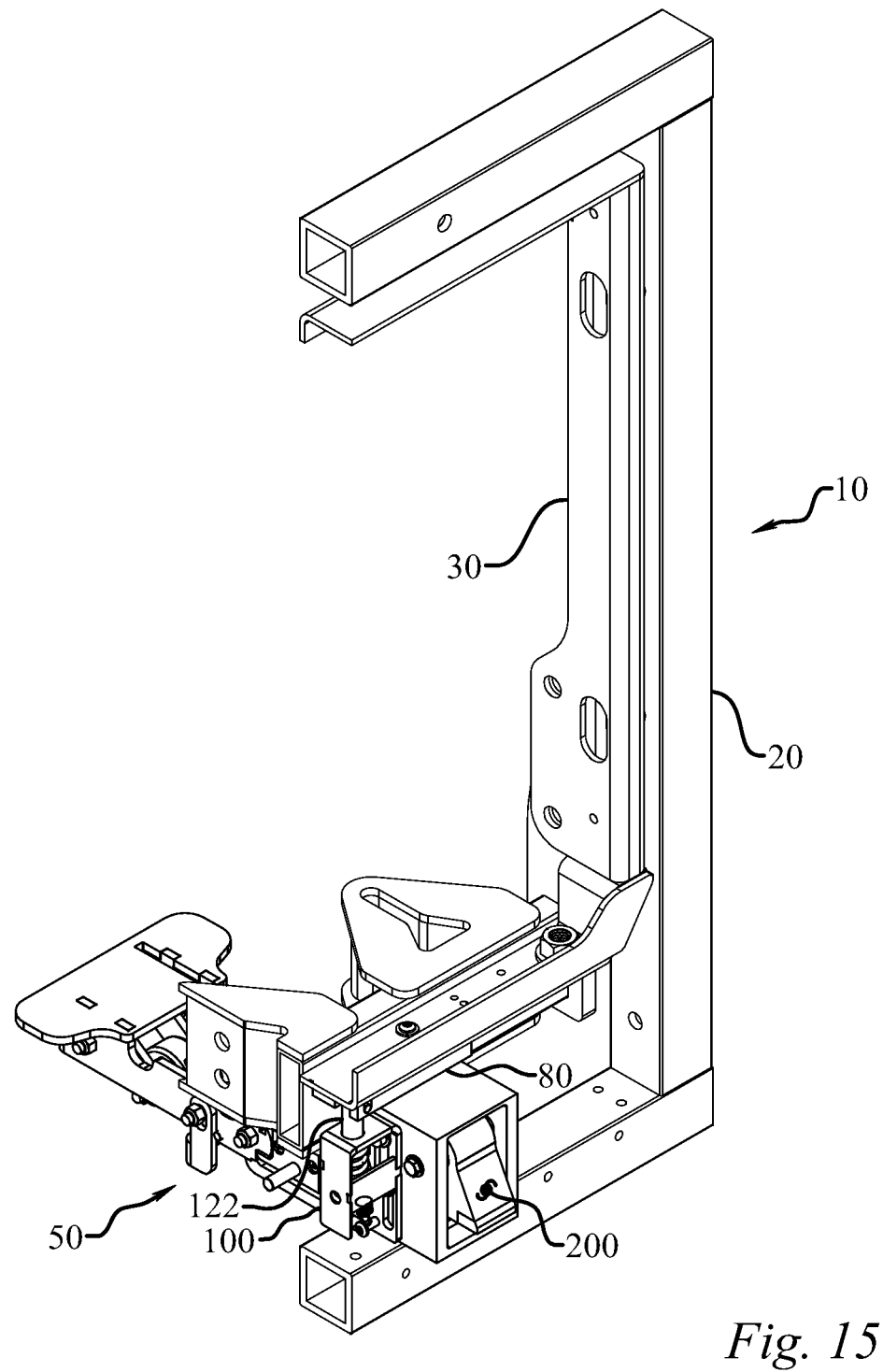
FIG. 15 is a partial cutaway, perspective view of an embodiment of a safety lockout system, not to scale.

As previously mentioned, the lockout assembly (50) includes an overload mechanism (100) that is involved in moving the retractable dog (200) from the engaged position to the disengaged position. In addition to that particular function, the overload mechanism (100) serves to prevent damage to the lockout assembly (50) when an overload situation occurs. An overload situation will occur when there is too much weight on the mast guided working surface. When an overload situation occurs and the retractable dog (200) is in the engaged position on the mast, operating the lifting means will raise the inner rollcase (30) and the upper connection plate (80), as seen in FIGS. 14 and 15. Since the overload mechanism (100) is connected to the upper connection plate (80) the overload mechanism (100) will try to raise the lifting cradle (110) that bears on the dog arm-to-overload pin (250), seen well in FIG. 21, to move the retractable dog (200) to the disengaged position. However, due to the excessive weight, the retractable dog (200) will be unable to move to the disengaged position, and hence the lifting cradle (110) will bear against, but will be unable to raise the dog arm-to-overload pin (250). In this situation, the overload mechanism (100) prevents the lifting cradle (110) from bending or otherwise damaging the dog arm-to-overload pin (250) due to the overload spring (120) absorbing the force associated with the excessive weight, as seen in FIG. 14.

In another embodiment, the lockout assembly (50) may include a notification system to alert the user that the retractable dog (200) is in the engaged position. For example, in one embodiment, a non-contact reed switch may be placed inside of the housing (90) and in communication with a power source and an alerting device. The reed switch may be actuated by a magnet that is disposed on a portion of the retractable dog (200). When the retractable dog (200) is in the disengaged position, the magnet is spaced from the reed switch so that the reed switch is open. When the retractable dog (200) moves to the engaged position, the magnet is caused to move so that it is proximate to the reed switch. In this position, the magnet actuates the reed switch to close it and complete the circuit to provide power to the alerting device. The alerting device may be an LED or an audible alarm that notifies the user that the retractable dog (200) is in the engaged position. Although a particular embodiment has been described, one with skill in the art will recognize that other configurations of contact and non-contact switch systems may be utilized. For example, the reed switch and magnet may be positioned and configured to alert the user that the retractable dog (200) is in the disengaged position.

Numerous alterations, modifications, and variations of the preferred embodiments disclosed herein will be apparent to those skilled in the art and they are all anticipated and contemplated to be within the spirit and scope of the safety lockout system (10) and lockout assembly (50), as claimed below. Although specific embodiments have been described in detail, those with skill in the art will understand that the preceding embodiments and variations can be modified to incorporate various types of substitute and or additional or alternative manufacturing processes and materials, relative arrangement of elements, and dimensional configurations. Accordingly, even though only few variations of the safety lockout system (10) and lockout assembly (50) are described herein, it is to be understood that the practice of such additional modifications and variations and the equivalents thereof, are within the spirit and scope of the safety lockout system (10) and lockout assembly (50) as defined in the following claims. The corresponding structures, materials, acts, and equivalents of all means or step plus function elements in the claims below are intended to include any structure, material, or acts for performing the functions in combination with other claimed elements as specifically claimed.

We claim:

1. A lockout assembly (50) for releasably locking a mast guided working surface to a mast, comprising:
   a) an overload mechanism (100) slidably connected to a housing (90), the overload mechanism (100) having a lifting cradle (110) and an overload spring (120) mounted about an overload spring post (122), wherein the overload spring post (122) is connected to an upper connection plate (80);
   b) a retractable dog (200) for engaging a portion of the mast, the retractable dog (200) connected to the housing (90) and the retractable dog (200) including a dog engagement pin (210), wherein the retractable dog (200) is movable between an engaged position and a disengaged position;
   c) a dog latch (220) releasably engaged with the dog engagement pin (210), wherein the dog latch (220) is movable between a latched position and an unlatched position;
   d) a dog arm (230) connected to the housing (90), and wherein the dog arm (230) is connected to the dog latch (220) by a dog latch-to-overload pin and a portion of the dog latch-to-overload pin seats on the lifting cradle (110); and
   e) wherein upward translation of the overload mechanism (100) with respect to the housing (90) causes the lifting cradle (110) to move the dog latch-to-overload pin in an upward and rearward direction causing the dog latch (220) to exert a force on the dog engagement pin (210) such that the retractable dog (200) moves from the engaged position to the disengaged position.

2. The lockout assembly (50) of claim 1, further including a dog bias spring (260) in communication with the retractable dog (200) for biasing the retractable dog (200) to the engaged position, wherein the dog bias spring (260) is mounted about a dog bias spring post (262), and wherein the dog bias spring post (262) is connected to a dog bias spring support shaft (264) that is secured to the housing (90).

3. The lockout assembly (50) of claim 1, further including a dog release device (300) for causing the dog latch (220) to move from the latched position to the unlatched position to release the dog engagement pin (210), the dog release device (300) comprising:
   a) a release pedal (310) connected to a rear frame member (60) that is connected to the housing (90), wherein the release pedal (310) is movable between a horizontal position and a vertical position;
   b) a release wheel (320) journaled about a release wheel axle (322), wherein the release wheel axle (322) is connected to the release pedal (310);
   c) a release spring (330) journaled about a mounting shaft (312) connected to the release pedal (310), the release spring (330) having a release spring first arm (332) and a release spring second arm (334);
   d) a latch release linkage (340) connected to the release wheel axle (322), wherein the latch release linkage (340) is movable between a retracted position and an extended position; and
   e) wherein a downward force applied to the release pedal (310) changes the state of the release spring (330) and moves the release wheel (320) in a forward direction causing the latch release linkage (340) to transition from the retracted position to the extended position, and wherein in the extended position a portion of the latch release linkage (340) contacts a portion of the dog latch (220) causing the dog latch (220) to rotate from the latched position to the unlatched position to disengage the dog engagement pin (210) so that the retractable dog (200) moves from the disengaged position to the engaged position.

4. The lockout assembly (50) of claim 3, wherein the dog latch (220) is spring biased toward the latched position.

5. The lockout assembly (50) of claim 3, further including a dog emergency release device (400) to move the retractable dog (200) from the engaged position to the disengaged position, the dog emergency release device (400) comprising:
   a) an emergency release lever (410) rotatably journaled about the mounting shaft (312), the emergency release lever (410) movable between a resting position and an operative position;
   b) an emergency release linkage (420) having an emergency release arm (450), wherein a portion of the emergency release linkage (420) is connected to the mounting shaft (312) and the emergency release linkage (420) is movable between an inactive position and an active position; and
   c) wherein when the emergency release lever (410) moves from the resting position to the operative position the emergency release lever (410) engages a portion of the emergency release linkage (420) causing the emergency release linkage (420) to move from the inactive position to the active position, and wherein in the active position the emergency release arm (450) engages and applies a force on the dog engagement pin (210) such that the retractable dog (200) moves from the engaged position to the disengaged position.

6. The lockout assembly (50) of claim 3, further including a lockout assembly locking device (500) comprising:
   a) a lock housing (510) slidably connected to the rear frame member (60), wherein the lock housing (510) has a gripping handle (512) for moving the lock housing (510) from a locked position to an unlocked position;
   b) a locking projection (530) extending from the lock housing (510) and engaging a portion of the release pedal (310) to prevent the release pedal (310) from rotating from the horizontal position to the vertical position when the lock housing (510) is in the locked position;
   c) wherein when the lock housing (510) moves from the locked position to the unlocked position the release pedal (310) is rotatable from the horizontal position to the vertical position, and rotation of the release pedal (310) to the vertical position causes a portion of the emergency release linkage (420) to move to the active position such that the emergency release arm (450) engages and applies a force on the dog engagement pin (210) to move the retractable dog (200) from the engaged position to the disengaged position; and
   d) wherein the lock housing (510) moves from the unlocked position to the locked position so that the locking projection (530) engages a retaining slot (314) on the release pedal (310) such that the release pedal (310) is retained in the vertical position and the retractable dog (200) is retained in the disengaged position.

7. The lockout assembly (50) of claim 6, wherein the lock housing (510) is spring biased toward the locked position.

8. A lockout assembly (50) for releasably locking a mast guided working surface to a mast, comprising:
   a) an overload mechanism (100) slidably connected to a housing (90), the overload mechanism (100) having a lifting cradle (110) and an overload spring (120) mounted about an overload spring post (122), wherein the overload spring post (122) is connected to an upper connection plate (80);
   b) a retractable dog (200) for engaging a portion of the mast, the retractable dog (200) connected to the housing (90) and the retractable dog (200) including a dog engagement pin (210), wherein the retractable dog (200) is movable between an engaged position and a disengaged position;
   c) a dog latch (220) releasably engaged with the dog engagement pin (210), wherein the dog latch (220) is movable between a latched position and an unlatched position;
   d) a dog arm (230) connected to the housing (90), and wherein the dog arm (230) is connected to the dog latch (220) by a dog latch-to-overload pin and a portion of the dog latch-to-overload pin seats on the lifting cradle (110);
   e) wherein upward translation of the overload mechanism (100) with respect to the housing (90) causes the lifting cradle (110) to move the dog latch-to-overload pin in an upward and rearward direction causing the dog latch (220) to exert a force on the dog engagement pin (210) such that the retractable dog (200) moves from the engaged position to the disengaged position; and
   f) a dog release device (300) for causing the dog latch (220) to move from the latched position to the unlatched position to release the dog engagement pin (210), the dog release device (300) comprising:
      i) a release pedal (310) connected to a rear frame member (60) that is connected to the housing (90), wherein the release pedal (310) is movable between a horizontal position and a vertical position;
      ii) a release wheel (320) journaled about a release wheel axle (322), wherein the release wheel axle (322) is connected to the release pedal (310);
      iii) a release spring (330) journaled about a mounting shaft (312) connected to the release pedal (310), the release spring (330) having a release spring first arm (332) and a release spring second arm (334);
      iv) a latch release linkage (340) connected to the release wheel axle (322), wherein the latch release linkage (340) is movable between a retracted position and an extended position; and
      v) wherein a downward force applied to the release pedal (310) changes the state of the release spring (330) and moves the release wheel (320) in a forward direction causing the latch release linkage (340) to transition from the retracted position to the extended position, and wherein in the extended position a portion of the latch release linkage (340) contacts a portion of the dog latch (220) causing the dog latch (220) to rotate from the latched position to the unlatched position to disengage the dog engagement pin (210) so that the retractable dog (200) moves from the disengaged position to the engaged position.

9. The lockout assembly (50) of claim 8, wherein the retractable dog (200) is spring biased toward the engaged position.

10. The lockout assembly (50) of claim 8, further including a dog emergency release device (400) to move the retractable dog (200) from the engaged position to the disengaged position, the dog emergency release device (400) comprising:
   a) an emergency release lever (410) rotatably journaled about the mounting shaft (312), the emergency release lever (410) movable between a resting position and an operative position;
   b) an emergency release linkage (420) having an emergency release arm (450), wherein a portion of the emergency release linkage (420) is connected to the mounting shaft (312) and the emergency release linkage (420) is movable between an inactive position and an active position; and
   c) wherein when the emergency release lever (410) moves from the resting position to the operative position the emergency release lever (410) engages a portion of the emergency release linkage (420) causing the emergency release linkage (420) to move from the inactive position to the active position, and wherein in the active position the emergency release arm (450) engages and applies a force on the dog engagement pin (210) such that the retractable dog (200) moves from the engaged position to the disengaged position.

11. The lockout assembly (50) of claim 10, further including a lockout assembly locking device (500) comprising:

a) a lock housing (510) slidably connected to the rear frame member (60), wherein the lock housing (510) has a gripping handle (512) for moving the lock housing (510) from a locked position to an unlocked position;

b) a locking projection (530) extending from the lock housing (510) and engaging a portion of the release pedal (310) to prevent the release pedal (310) from rotating from the horizontal position to the vertical position when the lock housing (510) is in the locked position;

c) wherein when the lock housing (510) moves from the locked position to the unlocked position the release pedal (310) is rotatable from the horizontal position to the vertical position, and rotation of the release pedal (310) to the vertical position causes a portion of the emergency release linkage (420) to move to the active position such that the emergency release arm (450) engages and applies a force on the dog engagement pin (210) to move the retractable dog (200) from the engaged position to the disengaged position; and d) wherein the lock housing (510) moves from the unlocked position to the locked position so that the locking projection (530) engages a retaining slot (314) on the release pedal (310) such that the release pedal (310) is retained in the vertical position and the retractable dog (200) is retained in the disengaged position.

* * * * *